(12) United States Patent
Yamaguchi et al.

(10) Patent No.: US 11,276,871 B2
(45) Date of Patent: Mar. 15, 2022

(54) ELECTROLYTE MEMBRANE AND METHOD FOR PRODUCING SAME

(71) Applicants: TOKYO INSTITUTE OF TECHNOLOGY, Tokyo (JP); TEIJIN LIMITED, Osaka (JP); KANAGAWA INSTITUTE OF INDUSTRIAL SCIENCE AND TECHNOLOGY, Ebina (JP)

(72) Inventors: Takeo Yamaguchi, Tokyo (JP); Yuhei Oshiba, Tokyo (JP); Hidenori Ohashi, Tokyo (JP); Jin Tomatsu, Tokyo (JP); Koji Furuya, Osaka (JP); Takao Ohno, Osaka (JP); Mami Nanbu, Osaka (JP)

(73) Assignees: TOKYO INSTITUTE OF TECHNOLOGY, Tokyo (JP); TEIJIN LIMITED, Osaka (JP); KANAGAWA INSTITUTE OF INDUSTRIAL SCIENCE AND TECHNOLOGY, Ebina (JP)

(*) Notice: Subject to any disclaimer, the term of this patent is extended or adjusted under 35 U.S.C. 154(b) by 58 days.

(21) Appl. No.: 16/320,354

(22) PCT Filed: May 31, 2017

(86) PCT No.: PCT/JP2017/020368
§ 371 (c)(1),
(2) Date: Jan. 24, 2019

(87) PCT Pub. No.: WO2018/020826
PCT Pub. Date: Feb. 1, 2018

(65) Prior Publication Data
US 2019/0267655 A1    Aug. 29, 2019

(30) Foreign Application Priority Data

Jul. 25, 2016 (JP) .............................. JP2016-145735

(51) Int. Cl.
*H01M 8/106* (2016.01)
*H01M 8/1062* (2016.01)
(Continued)

(52) U.S. Cl.
CPC ............... *H01M 8/106* (2013.01); *C08J 9/42* (2013.01); *C25B 1/04* (2013.01); *C25B 9/73* (2021.01);
(Continued)

(58) Field of Classification Search
CPC .... H01M 8/106; H01M 8/102; H01M 8/1062; C25B 9/73; C25B 1/04; C25B 13/08; C08J 9/42
See application file for complete search history.

(56) References Cited

U.S. PATENT DOCUMENTS

| 4,849,311 A | 7/1989 | Itoh et al. |
| 2003/0044669 A1 | 3/2003 | Hidaka et al. |

(Continued)

FOREIGN PATENT DOCUMENTS

| JP | 64-22932 A | 1/1989 |
| JP | 1-158051 A | 6/1989 |

(Continued)

OTHER PUBLICATIONS

International Search Report for PCT/JP2017/020368 dated Aug. 15, 2017.
(Continued)

*Primary Examiner* — James Lee
(74) *Attorney, Agent, or Firm* — Sughrue Mion, PLLC

(57) ABSTRACT

To provide an electrolyte membrane that exhibits high proton conductivity even at low humidity, the electrolyte membrane includes a composite membrane including: a microporous polyolefin membrane that has an average pore diameter of 1 to 1000 nm and a porosity of 50 to 90% and (Continued)

that can be impregnated with a solvent having a surface free energy of 28 mJ/m² or more, and an electrolyte containing a perfluorosulfonic acid polymer having an EW of 250 to 850 loaded into the pores of the microporous polyolefin membrane, wherein the membrane thickness of the composite membrane is 1 to 20 μm.

11 Claims, 7 Drawing Sheets

(51) Int. Cl.
| | | |
|---|---|---|
| *C25B 13/08* | (2006.01) | |
| *H01M 8/1025* | (2016.01) | |
| *H01M 8/1039* | (2016.01) | |
| *H01M 8/1081* | (2016.01) | |
| *H01M 8/1086* | (2016.01) | |
| *H01B 1/12* | (2006.01) | |
| *H01B 1/10* | (2006.01) | |
| *H01B 13/00* | (2006.01) | |
| *H01M 8/02* | (2016.01) | |
| *C08J 9/42* | (2006.01) | |
| *H01B 1/06* | (2006.01) | |
| *H01M 8/10* | (2016.01) | |
| *C25B 1/04* | (2021.01) | |
| *C25B 9/73* | (2021.01) | |

(52) U.S. Cl.
CPC ............ *C25B 13/08* (2013.01); *H01B 1/06* (2013.01); *H01B 1/10* (2013.01); *H01B 1/12* (2013.01); *H01B 13/00* (2013.01); *H01M 8/02* (2013.01); *H01M 8/10* (2013.01); *H01M 8/109* (2013.01); *H01M 8/1025* (2013.01); *H01M 8/1039* (2013.01); *H01M 8/1062* (2013.01); *H01M 8/1081* (2013.01); *H01M 2008/1095* (2013.01); *H01M 2300/0082* (2013.01); *Y02E 60/50* (2013.01); *Y02P 70/50* (2015.11)

(56) References Cited

U.S. PATENT DOCUMENTS

| | | |
|---|---|---|
| 2011/0318669 A1 | 12/2011 | Miyake et al. |
| 2016/0322662 A1 | 11/2016 | Schmitz et al. |

FOREIGN PATENT DOCUMENTS

| | | |
|---|---|---|
| JP | 2003-41031 A | 2/2003 |
| JP | 2005-166557 A | 6/2005 |
| JP | 2009-242688 A | 10/2009 |
| JP | 2011-241361 A | 12/2011 |
| JP | 2013-62240 A | 4/2013 |
| JP | 2014-110232 A | 6/2014 |
| WO | 98/20063 A1 | 5/1998 |
| WO | 2010/101195 A1 | 9/2010 |
| WO | 2015/090571 A1 | 6/2015 |

OTHER PUBLICATIONS

Wikipedia: "Surface tension", Sep. 24, 2020, pp. 1-22, Retrieved from the Internet: URL:https://en.wikipedia.org/wiki/Surface_tension [retrieved on Oct. 8, 2020] (22 pages total).

ELECTROLYTE MEMBRANE AND METHOD FOR PRODUCING SAME

CROSS REFERENCE TO RELATED APPLICATIONS

This application is a National Stage of International Application No. PCT/JP2017/020368, filed May 31, 2017, claiming priority based on Japanese Patent Application No. 2016-145735, filed Jul. 25, 2016.

FIELD

The present invention relates to a pore filling membrane type electrolyte membrane that can be suitably used for a solid polymer fuel cell, electrolysis of water, soda electrolysis, and the like, and a production method therefor.

BACKGROUND

Recently, need for improvement in the performance of electrolyte membranes, particularly solid polymer electrolyte membranes has been increasing. For example, attracting attention as a very clean energy system that does not generate carbon dioxide is a system that generates hydrogen by electrolysis of water using energy from renewable sources such as sunlight and wind power wherein the generated hydrogen is stored and then supplied to fuel cells which generate power in places in need of electricity at times when it is needed. In known techniques of water electrolysis, during the electrolysis of water, the positive electrode and negative electrode are separated by an electrolyte membrane, protons generated at the positive electrode migrate through the electrolyte membrane to the negative electrode, combining with electrons at the negative electrode to obtain hydrogen. Below are the equations for the reactions at both electrodes.

Positive electrode: $H_2O \rightarrow \frac{1}{2}O_2 + 2H^+ + 2e^-$

Negative electrode: $2H^+ + 2e^- \rightarrow H_2$

In fuel cells, protons generated by the hydrogen oxidation reaction at the negative electrode (anode) migrate to the positive electrode (cathode) through the electrolyte membrane where water is generated by the oxygen reduction reaction, thereby generating electricity. Below are the equations for the reactions at both electrodes.

Negative electrode: $H_2 \rightarrow 2H^+ + 2e^-$

Positive electrode: $\frac{1}{2}O_2 + 2H^+ + 2e^- \rightarrow H_2O$

As can be clearly seen from each of the above principles of operation, for both the electrolysis of water and fuel cells, improving proton conductivity of electrolyte membranes is a general problem. In order to improve proton conductivity in electrolyte membranes, measures such as reducing the thickness of the electrolyte membrane or reducing the dry mass (equivalent mass: EW) per equivalence of ion exchange groups of the electrolyte polymer may be implemented. However, there are limits to thinning from the viewpoint of the strength required for a diaphragm between electrodes, and the prevention of the permeation of fuel gas such as hydrogen (crossover phenomenon), etc. Further, a reduction in the EW leads to difficulties in maintaining the solid membrane as the ratio of the electrolyte membrane polymer skeleton decreases, and also leads to restrictions corresponding to the usage thereof in fuel cells. For example, in addition to water being generated at the positive electrode, some water along with protons migrate from the negative electrode through the electrolyte membrane to the positive electrode, and a flooding phenomenon wherein an air intake port at the positive electrode side is blocked by water can readily occur.

Furthermore, protons must be hydrated in order to migrate through the electrolyte membrane, and so it is necessary that the fuel cell be provided with a humidifier for replenishing the water gradually lost at the negative electrode side during operation to regulate the humidity to about 90%. Moreover, as the fuel cell requires the "use of water", it is necessary to provide a cooling device to maintain the running temperature of the fuel cell at around 60 to 80° C. These peripheral devices hinder reductions in cost and improved efficiency of the fuel cell system as a whole, and as such, the development of an electrolyte membrane that can be used at mid to high temperatures without the need for adding moisture is desired.

As a polymer electrolyte for a fuel cell, there is an example (Patent Literature 1) in which, by incorporating a polymer electrolyte into the internal spaces (voids) of a porous polymer membrane, an improvement in mechanical strength could be achieved which could not be attained by the electrolyte itself. Furthermore, a porous substrate suitable for holding a polymer electrolyte within a porous polyethylene membrane has been proposed (Patent Literature 2). Moreover, there is a prior art that provides a thin electrolyte membrane with excellent dynamic strength by the uptake and incorporation of an ion exchange resin into the network structure of a thin porous membrane of an ultra-high molecular weight polyolefin (Patent Literature 3). Further, there is a prior art that provides a thin electrolyte membrane with excellent dynamic strength by the uptake and incorporation of an ion conducting body into a porous solid polymer membrane by capillary condensation action (Patent Literature 4). However, these prior art electrolyte membranes still do not sufficiently solve the above problem.

CITATION LIST

Patent Literature

[PTL 1] Japanese Unexamined Patent Publication (Kokai) No. 2005-166557
[PTL 2] Japanese Unexamined Patent Publication (Kokai) No. 2011-241361
[PTL 3] Japanese Unexamined Patent Publication (Kokai) No. S64-22932
[PTL 4] Japanese Unexamined Patent Publication (Kokai) No. H1-158051

SUMMARY

Technical Problem

The object of the present invention is to fundamentally overcome the various problems mentioned above by providing an electrolyte membrane with high proton conductivity.

Solution to Problem

The inventors of the present invention, as a result of extensive research in order to solve the aforementioned problems, discovered that the various problems mentioned above could be fundamentally solved by a composite membrane comprising a specific microporous polyolefin membrane loaded with a low EW electrolyte polymer. That is, the present invention provides the following configuration.

[1] An electrolyte membrane comprising a composite membrane comprising: a microporous polyolefin membrane that has an average pore diameter of 1 to 1000 nm and a porosity of 50 to 90% and that can be impregnated with a solvent having a surface free energy at 20° C. of 28 mJ/m$^2$ or more; and
an electrolyte containing a perfluorosulfonic acid polymer having an EW of 250 to 850 loaded into pores of the microporous polyolefin membrane; wherein
the composite membrane has a membrane thickness of 1 to 20 µm.

[2] The electrolyte membrane according to [1], wherein the average pore diameter is 5 to 100 nm.

[3] The electrolyte membrane according to [1] or [2], wherein the porosity is 50 to 78%.

[4] The electrolyte membrane according to any one of [1] to [3], wherein a microporous polyolefin membrane is provided that can be impregnated with a solvent having a surface free energy at 20° C. of 33 to 37 mJ/m$^2$.

[5] The electrolyte membrane according to any one of [1] to [4], wherein the electrolyte contains a perfluorosulfonic acid polymer having an EW of 450 to 650.

[6] The electrolyte membrane according to any one of [1] to [5], wherein the composite membrane has a membrane thickness of 5 to 12 µm.

[7] The electrolyte membrane according to any one of [1] to [6], wherein the electrolyte membrane is used as an electrolyte membrane for a solid polymer fuel cell, electrolysis of water and soda electrolysis.

[8] A method of manufacturing the electrolyte membrane of any one of [1] to [7] comprising the following steps:
impregnating a microporous polyolefin membrane that has an average pore diameter of 1 to 1000 nm and a porosity of 50 to 90% and that can be impregnated with a solvent having a surface free energy of 28 mJ/m$^2$ or more, with a solution comprising an electrolyte including a perfluorosulfonic acid polymer having an EW of 250 to 850 dissolved in a solvent;
removing the solvent by drying the microporous polyolefin membrane after the impregnation step; and
annealing the microporous polyolefin membrane after the removing step.

Advantageous Effects of Invention

According to the present invention, an electrolyte membrane that exhibits high proton conductivity even at low humidity can be obtained. Further, because of the combined effect of thinness of the membrane, an electrolyte membrane particularly useful for solid polymer fuel cells can be obtained.

DESCRIPTION OF EMBODIMENTS

Figure 1:
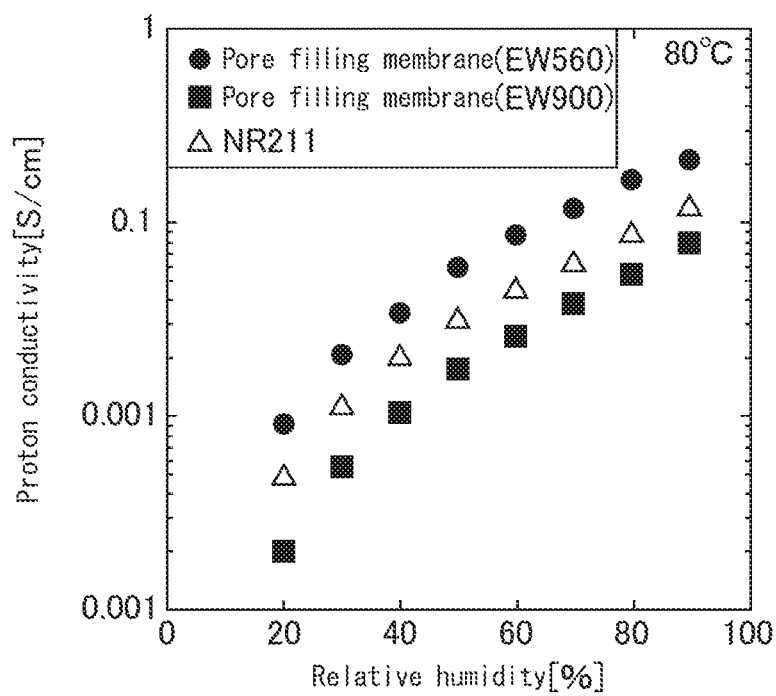
FIG. 1 is a graph comparing proton conductivity, as measured by AC impedance (in-plane), of the electrolyte using the microporous polyolefin membrane according to the present invention and a conventional electrolyte membrane.

The present invention is based on the discovery that a low EW electrolyte polymer can be easily loaded into a specific microporous polyolefin membrane. Conventionally, it has been difficult, in general, to impregnate and load the pores of a microporous polyolefin membrane with a highly hydrophilic and low EW electrolyte polymer. However, the present inventors focused on and studied the surface free energy of the solvent used in the electrolyte polymer solution, and as a result, discovered that even a low EW electrolyte polymer having an EW in the 500s, if formed into a solution thereof dissolved in a solvent that exhibits a specific surface free energy, can be easily loaded and impregnated into a microporous polyolefin membrane, whereby high proton conductivity as a whole can be exhibited.

The following embodiments of the present invention will be described in order. These explanations and examples are for exemplifying the invention and do not limit the scope of the invention. Note that, in the entire description, numerical ranges expressed by "to" include the upper value and lower value. Further, with regard to the microporous polyolefin membrane, "longitudinal direction" or "MD" refers to the direction of the length of the microporous polyolefin membrane that is produced in an elongated shape, and "transverse direction" or "TD" refers to a direction that is perpendicular to the longitudinal direction of the microporous polyolefin membrane.

[Microporous Polyolefin Membrane]

The microporous polyolefin membrane according to the present invention has an average pore diameter of 1 to 1000 nm and a porosity of 50 to 90% and can be impregnated with a solvent having a surface free energy at 20° C. of 28 mJ/m$^2$ or more.

(Average Pore Diameter)

The average pore diameter of the microporous polyolefin membrane of the present invention is 1 to 1000 nm. When the average pore diameter of the microporous polyolefin membrane is 1000 nm or less, even if the porosity of the microporous membrane is high, the microporous polyolefin membrane becomes favorable in terms of dynamic strength, and handleability is improved. Furthermore, for a given porosity, the smaller the average pore diameter the greater the frequency of pores present in the microporous membrane, which allows homogenous loading of the electrolyte compound over the entire microporous polyolefin membrane. Furthermore, as the frequency of pores present over the surface of the microporous membrane increases, the more favorable the permeability to solvents used for the electrolyte compound which have a higher surface free energy. From such a viewpoint, it is preferable for the microporous polyolefin membrane to have an average pore diameter of 500 nm or less, more preferable is 100 nm or less, even more preferable is 50 nm or less, particularly preferable is 45 nm or less, and even more particularly preferable is 40 nm or less. When the average pore diameter is 1 nm or more, the permeation speed of a solvent with a high surface free energy is improved. From such a viewpoint, it is preferable for the microporous polyolefin membrane to have an average pore diameter of 5 nm or more, and more preferably 10 nm or more.

The average pore diameter of the microporous polyolefin membrane can be measured by the methods described in the examples below.

(Porosity)

The microporous polyolefin membrane of the present invention has a porosity of 50 to 90%. A porosity of 50% or more is desirable because the loading rate of the electrolyte compound becomes high, and the properties of the electrolyte compound itself can be sufficiently expressed and also because permeation of a solution, in which the electrolyte compound is dissolved, into the microporous membrane is facilitated and the rate of permeation is accelerated. From such a viewpoint, a microporous polyolefin membrane porosity of 55% or more is preferable, and more preferable is 60% or more. On the other hand, when the porosity is 90% or less, the dynamic strength of the microporous polyolefin membrane becomes favorable which is desirable in terms of improved handleability. From such a viewpoint, a microporous polyolefin membrane porosity of 85% or less is preferable, more preferable is 78% or less, 75% or less is particularly preferable, and 66% or less is even more particularly preferable.

The porosity ($\varepsilon$) of the microporous polyolefin membrane can be measured by the measuring methods described below in the Examples and is calculated with the following formula.

$$\varepsilon(\%) = \{1 - Ws/(ds \cdot t)\} \times 100$$

Ws: weight of microporous polyolefin membrane (g/m$^2$)
ds: true density of polyolefin (g/cm$^3$)
t: thickness of microporous polyolefin membrane (μm)

(Surface Free Energy of Solvent with which a Membrane can be Impregnated)

The microporous polyolefin membrane substrate according to the present invention can be impregnated with a solvent having a surface free energy of 28 mJ/m$^2$ or more. The surface free energy of a solvent as used herein is a value measured at 20° C. Further, the phrase "can be impregnated" refers to a property whereby, upon contact with a solvent, the pores of a microporous membrane can be spontaneously impregnated therewith without carrying out a forced loading process under an increased or decreased pressure.

In general, as microporous polyolefin membranes have low surface free energy and high water repellency, they are difficult to wet with a hydrophilic liquid having a high surface free energy and it is difficult to load the pores of the microporous membrane with a hydrophilic substance such as an electrolyte compound. Methods of modifying the surface of microporous polyolefin membranes to make them hydrophilic are well known (hydrophilization treatment), but for example, with chemical surface treatment (treatment with a surfactant, etc.) the desired performance may be impaired by impurities remaining in the porous membrane. Physical surface treatment (plasma treatment, corona treatment, etc.) has the disadvantage of damaging the microporous membrane thereby lowering the physical strength thereof, and especially cannot be used for an electrolyte membrane requiring thinning.

A surface free energy for the solvent of 28 mJ/m$^2$ or more is desirable as it is possible to increase the concentration of the electrolyte compound dissolved in the solvent and hence improve the loading efficiency of the electrolyte compound into the microporous membrane. However, it has conventionally been impossible to impregnate a microporous polyolefin membrane with a solvent (liquid) having a surface free energy of 28 mJ/m$^2$ or more, especially if hydrophilization treatment has not been implemented, without a forced loading process carried out under an increased or decreased pressure.

The upper limit of the surface free energy of the solvent is a numerical value at which impregnation of the microporous polyolefin membrane satisfying the aforementioned average pore diameter and the porosity becomes impossible and is approximately 38 mJ/m$^2$. In order to increase the affinity between the solvent that dissolves the hydrophilic electrolyte compound and the microporous polyolefin membrane and facilitate permeation of the solution in which the electrolyte compound is dissolved into the microporous membrane, it is preferable for the surface free energy of the solvent to be low. As described, with respect to the surface free energy of the solvent used in the present invention, there is a trade-off between the concentration of the electrolyte solution and the ability to impregnate the microporous membrane, and in specific individual applications is appropriately set to within the ranges of 28 mJ/m$^2$ or more, preferably 33 mJ/m$^2$ or more, more preferably 35 mJ/m$^2$ or more and 38 mJ/m$^2$ or less, preferably 37 mJ/m$^2$ or less, more preferably 36.5 mJ/m$^2$ or less.

As a method of adjusting the surface free energy of the solvent, an organic solvent such as an alcohol (methanol, ethanol, isopropanol, t-butyl alcohol, etc.), ethylene glycol, tetrahydrofuran, acetone, methyl ethyl ketone, dimethylformamide, and triethylamine, may be mixed into water. For reference, the surface free energy at 20° C. is 72.8 mJ/m$^2$ for water, 22.39 mJ/m$^2$ for ethanol, 23.71 mJ/m$^2$ for 1-propanol, 25.28 mJ/m$^2$ for 1-butanol, 18.40 mJ/m$^2$ for hexane, and 11.91 mJ/m$^2$ for perfluorohexane.

(Membrane Thickness)

The microporous polyolefin membrane of the present invention has a thickness of 1 μm to 20 μm as a composite membrane having pores loaded with an electrolyte, as will be described below. When the thickness of the composite membrane is 1 μm or more, sufficient dynamic strength can be easily attained, making it is desirable in win's of handleability during the processing of the microporous polyolefin membrane or in terms of allowing stable transportation thereof during the processing of impregnation with the electrolyte solution. From such a viewpoint, it is preferable for the composite membrane to be 3 μm or more, and more preferably 4 μm or more, and even more preferably 5 μm or more. On the other hand, if the thickness is 20 μm or less, the time required for impregnation of the microporous polyolefin membrane with the electrolyte solution becomes shorter, and the electrolyte compound can be loaded homogeneously without any patches over the entire microporous membrane. Further, the increase of proton conductivity of the electrolyte membrane impregnated with the electrolyte compound is favorable. From such a viewpoint, a composite membrane thickness of 15 µm or less is preferable, more preferable is 12 µm or less, particularly preferable is 10 µm or less, and even more preferable is 9 µm or less.

In general, microporous polyolefin membranes are opaque and white due to dispersion of light by the presence of pores. However, as the pores are substantially loaded with an electrolyte compound solution, light dispersion is reduced, and with the combined effect of the thin membrane thickness, the obtained electrolyte membrane sometimes becomes substantially transparent over the entirety thereof.

(Contact Angle)

A microporous polyolefin membrane which can be impregnated with a solvent having a surface free energy of 28 $mJ/m^2$ or more can be defined in terms of the contact angle made between the surface of the membrane and the solvent. In particular, for the microporous polyolefin membrane of the present invention, when a mixed solution of ethanol and water (volume ratio ½; 33% aqueous ethanol solution) is dripped onto the surface of the microporous polyolefin membrane which has not undergone hydrophilization treatment and which is placed in a horizontal plane, it is preferable for the contact angle between the droplet and the surface 1 second after the dripping to be 0 to 90 degrees. When the contact angle after 1 second is 90 degrees or less, there is a synergistic effect with the porous structure having the above porosity and average pore diameter such that permeation of the electrolyte solution into the microporous membrane is facilitated. From such a viewpoint, a contact angle after 1 second of 88 degrees or less is preferable, and more preferable is 85 degrees or less.

Furthermore, for the microporous polyolefin membrane of the present invention, it is preferable for the contact angle between the droplet and the surface to be 0 to 70 degrees 10 minutes after the dripping. When the contact angle is 70 degrees or less 10 minutes after the dripping, the electrolyte solution can more easily permeate the microporous membrane, making it desirable in terms of sufficiently loading the microporous membrane with the electrolyte compound. From such a viewpoint, a contact angle after 10 minutes of 65 degrees or less is preferable, and more preferable is 60 degrees or less. The contact angle can be measured using the measurement methods described below in the examples.

Note that, when the aqueous ethanol solution is dripped on the microporous polyolefin membrane of the present invention, the droplet does not spread outward in the radial direction, but rather the droplet exhibits the behavior of maintaining the diameter thereof or shrinking inward in the radial direction when permeating the microporous membrane.

(Rate of Change of Contact Angle)

The microporous polyolefin membrane according to the present invention can also be defined from the viewpoint of the change over time of the contact angle. Namely, when a mixed solution of ethanol and water (volume ratio ½) is dripped onto the surface of a microporous polyolefin membrane which has not undergone hydrophilization treatment, it is desirable that a contact angle θ1 between the droplet and the surface be 0 to 90 degrees 1 second after the dripping, and a contact angle θ2 between the droplet and the surface be 0 to 70 degrees 10 minutes after the dripping, and a rate of change of the contact angle $((\theta 1-\theta 2)/\theta 1\times 100)$ be 10 to 50%. When the rate of change of the contact angle is 10% or more, it is considered that the permeation rate of the electrolyte solution into the microporous polyolefin membrane is sufficient from the viewpoint of practical production efficiency. From such a viewpoint, it is preferable for the rate of change of contact angle to be 15% or more, and more preferably 17% or more. On the other hand, from the viewpoint of maintaining sufficient dynamic strength of the microporous polyolefin membrane, it is preferable for the rate of change of the contact angle to be 45% or less, more preferably 41% or less.

In the present invention, if necessary, the average pore diameter and porosity of the aforementioned microporous polyolefin membrane, as well as the contact angle, are adjusted to within suitable ranges. The means by which these physical properties are controlled is in no way limited. However, production conditions can be adjusted for: the average molecular weight of the polyethylene resin; the mixing ratio when a plurality of polyethylene resins are mixed and used; the polyethylene resin concentration in the raw material; the mixing ratio of solvents mixed into the raw material when a plurality thereof are mixed and used; the stretch ratio and the heat treatment (heat setting) temperature after stretching; and the soaking time in an extraction solvent, etc. In particular, as will be indicated below, it is preferable that: the mass ratio of a high molecular weight polyethylene in the entire polyethylene composition be 20 to 80% by mass; that the polyethylene resin in the raw material comprise 5% by mass or more of a high molecular weight polyethylene with a mass-average molecular weight of 900,000 or more; that a mixture of a volatile solvent and a nonvolatile solvent be used as a solvent of the polyolefin solution (content of nonvolatile solvent in the whole solvent is 80 to 98% by mass); that the stretch ratio of the entirety be a ratio of 45 to 100; and that the heat setting temperature be 120 to 135° C.

(Gurley Value)

The microporous polyolefin membrane according to the present invention has a Gurley value, as measured according to JIS P8117, of preferably 90 s/100 cc or less, more preferably 85 s/100 cc or less, and even more preferably of 75 s/100 cc or less. When this Gurley value is 90 s/100 cc or less, the electrolyte compound solution readily permeates the microporous membrane, which is desirable from the point of the impregnation speed becoming faster.

(Tensile Breaking Strength)

The microporous polyolefin membrane of the present invention has a tensile breaking strength (converted value per unit cross-sectional area of polyolefin solid content) in at least one of the longitudinal direction (MD) and the transverse direction (TD) of preferably 50 MPa or more, and more preferably 60 MPa or more. When the strength of the microporous polyolefin membrane is 50 MPa or more, the dynamic strength of the composite membrane becomes favorable, and the handleability improves favorably in the step of impregnating the microporous polyolefin membrane with an electrolyte compound solution.

(Polyolefin)

The microporous polyolefin membrane according to the present invention is a microporous membrane composed of polyolefin. The microporous membrane has many micropores therein and has a structure wherein these micropores are interconnected, meaning that gas or liquid can pass from one surface to the other surface. It is preferable for the microporous polyolefin membrane to comprise polyolefin at 90% by mass or more, more preferably 95% by mass or more and the remainder may include additives such as organic or inorganic fillers or surfactants in amounts limited so as not to influence the effects of the invention.

The polyolefin may be, for example, a homopolymer or a copolymer of polyethylene, polypropylene, polybutylene, or polymethylpentene, or may be a mixture of one or more thereof, and among these, polyethylene is preferable. Low molecular weight polyethylene or a mixture of low molecular weight polyethylene and high molecular weight polyethylene is suitable as the polyethylene. Furthermore, polyethylene may be used in combination with another component. Examples of components other than polyethylene include polypropylene, polybutylene, polymethylpentene, and a copolymer of polypropylene and polyethylene. The polyolefin may be a combination of a plurality of polyolefins having poor compatibility with each other, having different degrees of polymerization and branching properties, in other words, a plurality of polyolefins having different crystallinity, stretching properties and molecular orientation.

The polyolefin used in the present invention is preferably a polyethylene composition comprising 5% by mass or more of a high molecular weight polyethylene with a mass-average molecular weight of 900,000 or more, more preferably a composition comprising 7% by mass or more of the high molecular weight polyethylene, and particularly a composition comprising 15 to 90% by mass of the high molecular weight polyethylene. Moreover, blending a suitable amount of two or more types of polyethylene has the effect of forming a network structure that accompanies fibrillation upon stretching and increasing the pore generation rate. The mass-average molecular weight after blending two or more types of polyethylene is preferably 500,000 to 4.500,000, more preferably 500,000 to 4,000,000. In particular, a polyethylene composition comprising a blend of the aforementioned high molecular weight polyethylene with a mass-average molecular weight of 900,000 or more and a low molecular weight polyethylene with a mass-average molecular weight of 200,000 to 800,000 is preferable. In such cases, it is particularly preferable for the ratio of the high molecular weight polyethylene in the polyethylene composition to be 20-80% by mass. The density of the low molecular weight polyethylene is preferably 0.92-0.96 g/cm$^3$. The upper limit value of the mass-average molecular weight of the high molecular weight polyethylene is preferably 6,000,000 or less, and 5,000,000 or less is particularly preferable. The lower limit value of the mass-average molecular weight of the high molecular weight polyethylene is preferably 1,000,000 or more, more preferably 2,000,000 or more, and 3,000,000 or more is particularly preferable.

Note that the mass-average molecular weight was determined by dissolving a sample of the microporous polyolefin membrane in o-dichlorobenzene by heating and measuring the sample by GPC (Alliance GPC 2000, GMH 6-HT and GMH 6-HTL columns, manufactured by Waters) at a column temperature of 135° C. and a flow rate 1.0 mL/min. Molecular weight monodisperse polystyrene (manufactured by Tosoh Corporation) may be used for calibrating the molecular weight.

(Method for Producing Microporous Polyolefin Membrane)

The microporous polyolefin membrane of the present invention can be favorably produced by the method indicated below. That is, by sequentially implementing the following steps the membrane can be favorably produced.

(I) A step of preparing a solution containing a polyolefin composition and a solvent, wherein the solution contains at least a volatile solvent having a boiling point of less than 210° C. at atmospheric pressure.

(II) A step of melt-kneading the solution, extruding the melt-kneaded product from a die, cooling and solidifying to obtain a gel-like molded product.

(III) A step of stretching the gel-like molded product in at least one direction.

(IV) A step of extracting and washing the solvent from the inside of the stretched intermediate molded product.

In step (I) a solution containing the polyolefin composition and a solvent is prepared, and a solution is prepared that contains at least a volatile solvent with a boiling point of less than 210° C. at atmospheric pressure. The solution is preferably a thermo-reversible sol-gel solution, that is, the polyolefin is solated by heating and dissolving in the solvent thereby preparing a thermo-reversible sol-gel solution. The volatile solvent with a boiling point of less than 210° C. at atmospheric pressure in step (I) is not particularly limited provided sufficient swelling or solvation of the polyolefin can be caused thereby. However, liquid solvents such as tetralin, ethylene glycol, decalin, toluene, xylene, diethyl triamine, ethylenediamine, dimethyl sulfoxide, hexane and the like are preferred, and these solvents may be used alone or in combination of two or more. There among, decalin and xylene are preferred.

Furthermore, other than the aforementioned volatile solvent with a boiling point of less than 210° C. at atmospheric pressure, when preparing this solution, the inclusion of a nonvolatile solvent having a boiling point of 210° C. or more such as liquid paraffin, paraffin oil, mineral oil, castor oil or the like is preferable in terms of facilitating the adjustment of average pore diameter and porosity to within the range of the present invention. In such cases, it is preferable for the content of the nonvolatile solvent to be 80 to 98% by mass of the whole solvent.

In the solution of step (I), from the viewpoint of controlling the loading rate of the electrolyte compound into the microporous polyolefin membrane, it is preferable for the concentration of the polyolefin composition to be 10 to 35% by mass, more preferably 15 to 30% by mass.

In step (II), the solution prepared in the step (I) is melt-kneaded, the obtained melt-kneaded product is extruded through a die and cooled and solidified to obtain a gel-like molded product. Preferably, an extrudate is obtained by extruding through the die at a temperature range from the melting point of the polyolefin composition to the melting point+65° C., then the extrudate is cooled to obtain a gel-like molded product.

It is preferable to form the molded product into a sheet shape. Cooling may involve quenching in an aqueous solution or an organic solvent or casting with a cooled metal roll, but in general, a method of quenching in water or the volatile solvent used at the time of the sol-gel solution is used. The cooling temperature is preferably 10 to 40° C. Note that it is preferable to prepare the gel-like sheet by providing a water stream on the surface layer of a water bath so that the mixed solution released from the sheet, which gellified in the water bath, and floating on the water surface does not adhere again to the sheet.

In step (II), one or more stages of preliminary heating may be carried out after the gel-like molded product is cooled as required, and some of the volatile solvent may be removed from the inside of the sheet. In such cases, the preliminary heating temperature is preferably 50 to 100° C.

Step (III) is a step of stretching the gel-like molded product in at least one direction. The stretching in step (III) is preferably biaxial stretching, and either sequential biaxial stretching in which longitudinal stretching and transverse stretching are separately carried out, or simultaneous biaxial stretching in which longitudinal stretching, and transverse stretching are simultaneously carried out can be suitably applied. Further, a method of stretching in the transverse direction after stretching a plurality of times in the longitudinal direction, a method of stretching in the longitudinal direction and stretching a plurality of times in the transverse direction, and a method of sequential biaxial stretching followed by further stretching one or more times in the longitudinal direction and/or the transverse direction are also favorable.

The area stretch ratio (the product of the longitudinal stretch ratio and the transverse stretch ratio) in the step (III), from the viewpoint of controlling the permeability of a mixed solution of ethanol and water (volume ratio ½) into the microporous polyolefin membrane, is preferably a ratio of 45 to 100, and more preferably a ratio of 50 to 91. The stretching temperature is preferably 90 to 110° C.

Subsequent to the stretching step (III), thermal fixing treatment may be performed as necessary. In such cases, the heat setting temperature is preferably 120 to 135° C. from the viewpoint of controlling the loading rate of the resin compound into the microporous polyolefin membrane substrate.

Step (IV) is a step of extracting and washing the solvent from the inside of the stretched intermediate molded product. In step (IV), in order to extract the solvent from the inside of the stretched intermediate molded product (stretched membrane), it is preferable to perform washing with a halogenated hydrocarbon such as methylene chloride or a hydrocarbon solvent such as hexane. It is preferable to take 20 to 180 seconds when washing by immersing in a tank containing a solvent in order to obtain a microporous polyolefin membrane from which less residual solvent is eluted. Furthermore, in order to further improve the cleaning effect, tanks are divided into a plurality of stages, a washing solvent is poured in from the downstream side of the microporous polyolefin membrane transporting process, a washing solvent is flowed toward the upstream side of the transporting process, and it is preferable to make the purity of the washing solvent in the downstream tank higher than that of the upstream layer. Depending on the required performance of the microporous polyolefin membrane, heat setting may be performed by annealing treatment. Note that the annealing treatment is preferably carried out at 60 to 130° C., and more preferably 70 to 125° C. from the viewpoint of transportability and the like during the process.

The microporous polyolefin membrane of the present invention is produced via the aforementioned steps and is characterized in that impregnation with a solution with a high surface free energy can be favorably achieved without implementing hydrophilization treatment involving chemical treatment (for example, coating of a surfactant, graft polymerization using a hydrophilic functional group, wetting treatment with a liquid with a low surface free energy, etc.), or physical treatment (for example, plasma treatment, corona treatment, etc.).

By not implementing the aforementioned chemical treatment, mixing of contaminants can be avoided leading to reduced production costs. Furthermore, by not implementing the physical treatment, degradation of the resin and a reduction in dynamic strength can be prevented.

(Electrolyte Membrane)

The electrolyte membrane according to the present invention comprises a dispersion composition of a perfluorosulfonic acid polymer having an EW of 250 to 850. As such a perfluorosulfonic acid polymer, a fluorine-containing ion exchange resin having an EW of 250 to 850 comprising repeating units of the following formulae (1) and (2) can be suitably used.

[Chem. 1]

[Chem. 2]

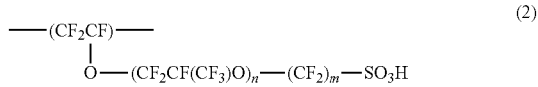

In the above formulae, Z is an H, Cl, F or a C1 to C3 perfluoroalkyl group, m is an integer of 0 to 12, and n is an integer of 0 to 2.

A favorable fluorine-containing ion exchange resin can be obtained by the hydrolysis of a fluorine-containing ion exchange resin precursor comprising a copolymer of the fluorinated olefin monomer represented below in formula (3) and the fluorinated vinyl compound represented below in formula (4).

[Chem. 3]

(In the formula, Z is an H, Cl, F or a C1 to C3 perfluoroalkyl group)

[Chem. 4]

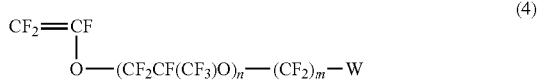

(In the formula, m is an integer of 0 to 12, n is an integer of 0 to 2, W is a functional group that can be converted to $SO_3H$ by hydrolysis).

Examples of the functional group W that can be converted to $SO_3H$ by hydrolysis include $SO_2F$, $SO_2Cl$, $SO_2Br$, etc. but are not particularly limited thereto.

It is preferable to use a fluorine-containing ion exchange resin precursor comprising a copolymer of the compounds in the above formulae (3) and (4) wherein W=$SO_2F$, and Z=F.

The aforementioned fluorine-containing ion exchange resin precursor may be synthesized by publicly-known methods. Examples thereof include: a method wherein a fluorinated olefin represented by formula (3) above (may simply be referred to as "fluorinated olefin" below) and the fluorinated vinyl compound represented by formula (4) (may simply be referred to as "fluorinated vinyl compound" below) are loaded and dissolved in a polymerization solvent of a fluorine-containing hydrocarbon or the like and made to polymerize (solution polymerization); a polymerization method of using the fluorinated vinyl compound itself as a polymerization solvent without the use of the fluorine-containing hydrocarbon solvent, etc. (bulk polymerization); a polymerization method of loading the fluorinated olefin and fluorinated vinyl compound into a medium of an aqueous solution of a surfactant and reacting (emulsion polymerization); a polymerization method of loading and emulsifying the fluorinated olefin and fluorinated vinyl compound into an aqueous solution of a co-emulsifier of a surfactant and an alcohol, etc. and reacting (mini-emulsion polymerization, micro-emulsion polymerization); and a polymerization method of loading and suspending the fluorinated olefin and fluorinated vinyl compound into an aqueous solution of a suspension stabilizer and reacting (suspension polymerization). A fluorine-containing ion exchange resin precursor created by any of the polymerization methods may be used.

As the fluorine-containing hydrocarbon used as a polymerization solvent for solution polymerization, a group of compounds generically called "freons" can be suitably used such as trichlorotrifluoroethane, 1,1,1,2,3,4,4,5,5,5-decafluoropentane.

As a guide to the degree of polymerization of the fluorine-containing ion exchange resin, it is preferable to use the melt flow rate of the fluorine-containing ion exchange resin precursor measured at a temperature of 270° C., an internal orifice radius of 2.09 mm, an orifice length of 8 mm, and a load of 2.16 kg. It is preferable for the melt flow rate of the fluorine containing ion exchange resin precursor to be 0.01 g/10 minutes or more, more preferably 0.1 g/10 minutes or more, and even more preferably 0.3 g/10 minutes or more. Further, it is preferable for the melt flow rate of the fluorine-containing ion exchange resin precursor to be 100 g/10 minutes or less, more preferably 50 g/10 minutes or less, and even more preferably 10 gi 10 minutes or less. A melt flow rate of 0.01 g/10 minutes or more for the fluorine-containing ion exchange resin precursor allows a dispersion composition of the fluorine-containing ion exchange resin precursor to be easily obtained. Furthermore, as the viscosity of the obtained dispersion composition decreases, it tends to be easier to handle during production of an electrolyte membrane or electrode. On the other hand, a melt flow rate of 100 g/10 minutes or less tends to increase the strength of the electrolyte membrane produced using the dispersion composition. In addition, as the water absorbency of the resin can be suppressed, when used as a binder material for a gas diffusion electrode, flooding during operation of the fuel cell is suppressed and favorable output tends to be obtained under a wide range of power generation conditions.

A fluorine-containing ion exchange resin precursor can be extrusion molded through a nozzle or a die using an extruder. This molding method, and shape of the molded body is not particularly limited, however, in order to accelerate the processes described below of hydrolysis and acid treatment, it is preferable for the molded body to be a pellet of 0.5 cm$^3$ or less, but powder or flakes of resin obtained after polymerization are acceptable.

The fluorine-containing ion exchange resin can be produced by performing hydrolysis treatment, for example, by means of a method involving soaking the fluorine-containing ion exchange resin precursor in a basic reaction solution.

The basic reaction solution used for hydrolysis is not particularly limited, however, aqueous solutions of hydroxides of alkali metals or alkali earth metals, such as sodium hydroxide and potassium hydroxide, are preferable. The amount of hydroxides of alkali metals or alkali earth metals in the aqueous solution is not particularly limited, although 10 to 30% by mass or less is preferable.

It is preferable for the aforementioned basic reaction solution to include an organic swelling solvent such as a dipolar solvent, for example, an alcohol such as methyl alcohol or ethyl alcohol, a ketone such as acetone, dimethylsulfoxide (hereinafter referred to as "DMSO"), N,N-dimethylacetamide (hereinafter referred to as "DMAC"), N,N-dimethylformamide (hereinafter referred to as "DMF"). The content of the organic solvent is preferably 1 to 30% by mass or less in the mixed solvent of the basic reaction solution.

The hydrolysis temperature in the hydrolysis treatment will differ according to the type of solvent, solvent composition, etc. used in hydrolysis treatment, however, the higher the hydrolysis temperature, the shorter the treatment time can be made, and from the point of easy handling of the fluorine-containing ion exchange resin precursor a temperature of 20 to 160° C. is preferable.

Provided that the functional groups W of the fluorine-containing ion exchange resin precursor have sufficient time to all be converted to $SO_3K$ or $SO_3Na$, there are no particular restrictions on the reaction time for the hydrolysis treatment. However, it is preferable for the reaction time to be 0.5 to 48 hours.

The fluorine-containing ion exchange resin can be produced by carrying out hydrolysis treatment of the fluorine-containing ion exchange resin precursor in a basic reaction solution, then washing with water or the like as necessary, followed by performing acid treatment.

The acid to be used for the acid treatment is not particularly limited provided it is a mineral acid such as hydrochloric acid, sulfuric acid, nitric acid, or an organic acid such as oxalic acid, acetic acid, formic acid, trifluoroacetic acid. Furthermore, the concentration of the acid used in the acid treatment is not particularly limited. The fluorine-containing ion exchange resin precursor is protonated by this acid treatment and converted to the $SO_3H$ form. Thereafter, washing is carried out with water etc., as necessary.

The fluorine-containing ion exchange resin has an EW of 250 or more, preferably 350 or more, more preferably 450 or more, and even more preferably 500 or more. Further, 850 is the upper limit, 750 or less is preferable, 650 or less is more preferable, and even more preferable is 600 or less. An EW of 850 or less will yield an electrolyte membrane with excellent electricity generating properties, and 250 or more will yield an electrolyte membrane with excellent mechanical strength. The EW for the fluorine-containing ion exchange resin can be measured with the methods described in the following examples.

(Fluorine-Containing Ion Exchange Resin Dispersion Composition)

The fluorine-containing ion exchange resin dispersion composition comprises the aforementioned fluorine-containing ion exchange resin and a solvent having a surface free energy of 28 mJ/m$^2$ or more. The content of the fluorine-containing ion exchange resin in the dispersion composition is preferably 15 to 45% by mass, more preferably, 17 to 43% by mass, and even more preferably 20 to 40% by mass. An ion exchange resin content of 15% by mass or more is desirable in that the amount of solvent that needs to be removed when producing an electrolyte membrane and electrode using a dispersion composition tends to decrease. However, a content of 45% by mass or less is desirable in that the viscosity of the obtained dispersion composition over time is stable, and abnormal increases in viscosity or partial gellification occurring during transportation and storage tend to be prevented.

The fluorine-containing ion exchange resin dispersion composition can be produced by blending 1% by mass to less than 15% of the aforementioned fluorine-containing ion exchange resin in a solvent having a surface free energy of 28 mJ/m$^2$ or more, and after dispersion treatment of the acquired aqueous composition, the aqueous solution is concentrated so that the concentration of the fluorine-containing ion exchange resin becomes 15% by mass to 45% by mass.

For the solvent having a surface free energy of 28 mJ/m$^2$ or more, a mixed solvent of the aforementioned organic solvent and water may be used, and therefrom the use of a mixed solvent of water and an alcohol is preferable. An alcohol with 1 to 3 carbon atoms is preferable in terms of the alcohol having a low boiling point. Such alcohols may be used individually or as a blend of 2 or more types. Specific examples include methanol, ethanol, 1-propanol, and 2-propanol, with methanol and ethanol being preferable. Further, it is preferable for the alcohol concentration in the mixed solvent containing water and an alcohol to be 49.9% by mass or less. An alcohol concentration of 49.9% by mass or less allows the viscosity of the dispersion composition to be reduced thereby allowing a high concentration of 15% by mass to 45% by mass of a fluorine-containing ion exchange resin to be included.

Without impairing the intended effects, diol solvents such as ethylene glycol, 1,2-propylene glycol, 1,3-propylene glycol and the like, dipolar organic solvents such as DMSO, DMAC, DMF and the like, fluorine-containing alcohols and fluorine-containing ethers may be mixed into the mixed solvent, and in the whole mixed solvent the concentration thereof is preferably 5% by mass or less.

(Method of Producing an Electrolyte Membrane)

The electrolyte membrane according to the present invention can be manufactured by a step of impregnating a microporous polyolefin membrane having an average pore diameter of 1 to 1000 nm and a porosity of 50 to 90% that can be impregnated with a solvent having a surface free energy of 28 mJ/m$^2$ or more, with a solution of an electrolyte comprising an EW 250 to 850 perfluorosulfonic acid polymer dissolved therein; a step of drying the microporous polyolefin membrane and removing the solvent after the impregnation step; and a step of annealing the microporous polyolefin membrane after the removal step. The microporous polyolefin membrane according to the present invention allows the spontaneous permeation of a solvent having a surface free energy of 28 mJ/m$^2$ or more into the pores thereof by merely contacting the porous membrane and without the implementation of a forced loading process carried out under an increased or decreased pressure. Thus, in the impregnation step, for example, merely spreading the electrolyte solution on a glass substrate in an air atmosphere and bringing the microporous polyolefin membrane into contact with the electrolyte solution by placing the membrane thereon was sufficient. In the solvent removal step after the impregnation step, merely leaving the polyolefin microporous membrane containing the electrolyte solution in an air atmosphere to dry naturally was sufficient. Further, in order to make the distribution of the electrolyte polymer within the electrolyte membrane uniform, after naturally drying the microporous polyolefin membrane, an additional electrolyte solution was applied thereon, that is, from the side opposite the glass substrate. The impregnation and drying steps may be repeated. By annealing the electrolyte membrane after the drying step, entanglement between electrolyte polymers can be promoted, and the physical strength of the electrolyte membrane can be enhanced. For the conditions of the annealing treatment, it is preferable to set the temperature to about 100° C. for about 10 to 20 hours in consideration of maintaining the porous structure of the microporous polyolefin membrane while approaching the glass transition temperature of the electrolyte polymer.

(Membrane Electrode Assembly: MEA)

When applying the electrolyte membrane of the present invention to a solid polymer fuel cell, gas diffusion electrodes containing catalyst layers are provided on both sides of the electrolyte membrane as an anode on one side and a cathode on the other. The thickness of the catalyst layer of the gas diffusion electrode in the membrane electrode assembly is not particularly limited. However, from the viewpoint of facilitating gas diffusion in the catalyst layer and improving battery characteristics, a catalyst layer thickness of 20 μm or less which is also uniform is preferable. By using a dispersion composition of the aforementioned fluorine-containing ion exchange resin, a catalyst layer with uniform thickness can be formed even at a thickness of 20 μm or less. When the thickness of the catalyst layer is made thinner, the amount of catalyst present per unit area decreases and there is the risk of reduced reaction activity. However, in such cases, by using a loaded catalyst loaded at a high loading rate with platinum or a platinum alloy as the catalyst, even if the catalyst layer is thin, the reaction activity of the electrode can be maintained at a high level without a shortage in the amount of catalyst. From such a viewpoint, it is preferable for the catalyst layer to have a thickness of 1 to 15 μm.

The gas diffusion electrode can be manufactured by, for example, applying the dispersion composition of the fluorine-containing ion exchange resin onto the surface of a commercially available gas diffusion electrode and thereafter drying and fixing at 140° C. in an air atmosphere. In addition, by preparing a coating liquid containing a dispersion composition of a fluorine-containing ion exchange resin and a catalyst powder in which catalytic metal particles are supported on a carbon support and applying the coating liquid onto a substrate, a catalyst layer for at least one of an anode and a cathode can be formed. The catalyst layer obtained by this method has few defects such as cracks and has excellent smoothness. Since the catalyst layer is formed by applying the coating solution and then removing the solvent (dispersion medium), by improving the strength of the ion exchange polymer which functions not only as an electrolyte, but also as a binder of the catalyst, it is possible to prevent cracking of the catalyst layer.

A solvent can be further added to the coating liquid. An alcohol, a fluorine-containing solvent or water are preferable for the added solvent. Alcohols are preferred, preferably with 1 to 4 carbon atoms in the main chain, examples include methanol, ethanol, n-propanol, isopropanol, tert-butanol and the like. Furthermore, by mixing water with the alcohol, the solubility of the fluorine-containing ion exchange resin can be improved. The fluorine-containing solvent can include for example: hydrofluorocarbons such as 2H-perfluoropropane, 1H,4H-perfluorobutane, 2H,3H-perfluoropentane, 3H,4H-perfluoro (2-methylpentane), 2H,5H-perfluorohexane, 3H-perfluoro(2-methylpentane); fluorocarbons such as perfluoro (1,2-dimethylcyclobutane), perfluoroctane, perfluoroheptane, perfluorohexane; hydrochlorofluorocarbons such as 1,1-dichloro-1-fluoroethane, 1,1,1-trifluoro-2,2-dichloroethane, 3,3-dichloro-1,1,1,2,2-pentafluoropropane, 1,3-dichloro-1,1,2,2,3-pentafluoropropane; fluorine-containing ethers such as 1H,4H,4H-perfluoro(3-oxapentane), 3-methoxy-1,1,1,2,3,3-hexafluoropropane; and fluorine-containing containing alcohols such as 2,2,2-trifluoroethanol, 2,2,3,3,3-pentafluoro-1-propanol, 1,1,1,3,3,3-hexafluoro-2-propanol.

The concentration of solid content in the coating liquid can be appropriately selected in accordance with the desired thickness of the catalyst layer and is not particularly limited. However, in order to form a uniform coating layer, the thickness is preferably from 1 to 50% by mass in terms of mass ratio with respect to the total mass and more preferably from 5 to 35% by mass. The substrate on which the coating solution is applied may be an ion exchange membrane or a gas diffusion layer disposed outside the catalyst layer which also functions as a current collector. A separately prepared substrate which is not a constituent material of the membrane electrode assembly may also be used. In such cases, the substrate may be released after the catalyst layer is bonded to the membrane. The separately prepared substrate is not particularly limited, but a membrane selected from polyethylene terephthalate, polyethylene naphthalate, polypropylene, polyethylene, polymethylpentene, polyimide, polyphenylene sulfide, polytetrafluoroethylene and the like can be used.

Examples of methods for producing the membrane electrode assembly include: (1) a method of applying the aforementioned coating liquid directly onto the electrolyte membrane then drying and removing the dispersion medium contained in the coating liquid to form a catalyst layer, followed by sandwiching the same between gas diffusion layers from both sides; (2) a method of applying the coating liquid on a substrate that will become the gas diffusion layer such as carbon paper, carbon cloth or carbon felt and drying to form a catalyst layer, followed by bonding the same to a solid polymer electrolyte membrane by a method such as hot pressing; (3) a method of applying the coating liquid to a membrane (substrate) exhibiting sufficient stability with respect to the solvent contained in the coating liquid, drying, hot pressing to a solid polymer electrolyte membrane, then peeling off the substrate membrane and sandwiching the same between gas diffusion layers.

The coating method is not particularly limited. Examples of batch type methods include the bar coater method, spin coater method, and screen printing method. Examples of continuous methods include the post-measurement method and pre-measurement method. The post-measurement method is a method of coating with excess coating liquid and removing the coating liquid so as to have a predetermined membrane thickness later. The pre-measurement method is a method of coating a coating liquid in an amount necessary for obtaining a predetermined membrane thickness. Examples of the post-measurement method include the air doctor coater method, blade coater method, rod coater method, knife coater method, squeeze coater method, impregnation coater method, and comma coater method. Examples of the pre-measurement method include the die coater method, reverse roll coater method, transfer roll coater method, gravure coater method, kiss roll coater method, cast coater method, spray coater method, curtain coater method, calendar coater method, and extrusion coater method. In order to form a uniform catalyst layer, the screen printing method and die coater method are preferable, and in consideration of production efficiency, the continuous die coater method is more preferable.

The catalysts contained in the catalyst layers on the anode side and the cathode side may be the same or different. However, it is preferable that a metal catalyst made of platinum or a platinum alloy is supported on carbon. It is preferable for the carbon serving as a carrier to have a specific surface area of 50 to 1,500 m$^2$/g so that the metal catalyst is supported on the carbon carrier with good dispersibility and so that excellent stable activity of the electrode reaction is achieved over a long period of time. The metal catalyst is preferably made of platinum as it is highly active in the oxidation reaction of hydrogen at the anode and the reduction reaction of oxygen at the cathode in the solid polymer fuel cell. It is also preferable that the metal catalyst is made of a platinum catalyst as further stability and activity may be imparted as an electrode catalyst. It is preferable for the platinum alloy to be an alloy of platinum and one or more metals selected from the group consisting of platinum group metals other than platinum (ruthenium, rhodium, palladium, osmium, iridium), gold, silver, chromium, iron, titanium, manganese, cobalt, nickel, molybdenum, tungsten, aluminum, silicon, zinc, and tin. The platinum alloy may contain an intermetallic compound of platinum and a metal alloyed with platinum. When a gas containing carbon monoxide is supplied at the anode, it is preferable to use an alloy containing platinum and ruthenium because the activity of the catalyst is stabilized.

In the membrane electrode assembly for a fuel cell, a gas containing oxygen is supplied to the cathode and a gas containing hydrogen is supplied to the anode. Specifically, for example, a separator with a groove serving as a gas flow path formed therein, is disposed outside the electrode of the membrane electrode assembly, and electricity is generated by supplying a gas serving as a fuel to the membrane electrode assembly by causing gas to flow through the gas flow path. The membrane electrode assembly can be used in a direct methanol fuel cell that supplies methanol as a fuel gas.

EXAMPLES

The embodiments of the present invention will be described more specifically and in further detail in the examples below. However, the embodiments of the present invention are not merely limited to these examples. Note that the evaluation methods and the measurement methods used in the embodiments of the present invention are as described below.

(Polyolefin Mass-Average Molecular Weight)

The mass-average molecular weight was determined by dissolving a sample of the microporous polyolefin membrane in o-dichlorobenzene by heating and measuring the sample by GPC (Alliance GPC 2000, GMH 6-HT and GMH 6-HTL columns, manufactured by Waters) at a column temperature of 135° C. and a flow rate 1.0 mL/min. Molecular weight monodisperse polystyrene (manufactured by Tosoh Corporation) may be used for calibrating the molecular weight.

(Membrane Thickness)

The membrane thickness of the sample was determined by measuring 20 points with a contact type membrane thickness meter (Lightmatic VL-50A, manufactured by Mitutoyo Corporation) and averaging the results. A columnar member having a diameter of 0.5 cm on the bottom surface was used as the contact terminal. During the measurement, adjustments were made such that a load of 0.01 N was applied.

(Average Pore Diameter)

The average pore diameter of the microporous polyolefin membrane was measured by using a perm-porometer (model: CFP-1500 AEX) manufactured by Porous Materials Co., Ltd. and GALWICK (perfluoropolyether with a surface tension of 15.9 dyne/cm manufactured by Porous Materials Co., Ltd.) as an impregnating solution. The mean flow pore diameter (nm) was calculated based on the half dry method specified in ASTM E 1294-89. The measurement temperature was 25° C. and the measurement pressure was 200 kPa to 3500 kPa.

(Porosity)

The porosity ($\varepsilon$) of the microporous polyolefin membrane was calculated using the following formula.

$$\varepsilon(\%) = \{1 - Ws/(ds \cdot t)\} \times 100$$

Ws: weight of porous polyolefin membrane (g/m$^2$)
ds: true density of polyolefin (g/cm$^3$)
t: thickness of microporous polyolefin membrane (μm)

Note that the weight of the microporous polyolefin membrane was determined by cutting out samples of 10 cm×10 cm, measuring the mass thereof, and dividing by the area.
(Contact Angle)

The static contact angle was measured using a fully automatic contact angle meter DMo-701 FE and Interface Measurement and Analysis System FAMAS manufactured by Kyowa Interface Science Co., Ltd as the measuring device. Using a microporous polyolefin membrane which had not undergone hydrophilization treatment, a 4 μL aqueous ethanol solution (industrial ethanol (purity of 95%)/pure water mixed volume ratio ½) was dripped onto the sample and a contact angle θ1 1 second after the dripping and a contact angle θ2 10 minutes after the dripping were measured at normal atmospheric pressure, 24° C. and 60% relative humidity.
(Gurley Value)

The Gurley value (sec/100 cc) of a microporous polyolefin membrane with an area of 642 mm² was measured according to JIS P8117.
(Tensile Breaking Strength)

A strip-shaped test piece (15 mm in width and 50 mm in length) was pulled at a speed of 200 mm/min with a tensile tester (RTE-1210 manufactured by Orientec Co., Ltd.) to determine the tensile strength when the test piece breaks.
(Rate of Change of Contact Angle)

The rate of change of contact angle was calculated with the following formula using contact angle θ1 and contact angle θ2 which were respectively obtained when the contact angle was measured 1 second and 10 minutes after a liquid was dripped on the surface and was used as an index of permeation speed. For example, when there are two samples with the same contact angle after 1 second, a greater rate of change of contact angle θ2 after 10 minutes means the permeation speed is faster.

$$\text{Rate of change of contact angle} = (\theta 1 - \theta 2)/\theta 1 \times 100(\%)$$

(Permeability of Ethanol and Water Mixture)

Various aqueous ethanol solutions were prepared by mixing pure water with industrial ethanol (purity of 95%) at various volume ratios. A sample was placed on and closely contacted with a piece of paper with which the absorption of water could be easily seen. 10 uL of the prepared aqueous ethanol solution was dripped on the sample, and presence or absence of liquid permeation after dripping at atmospheric pressure at 24° C. and relative humidity of 60% was observed. The liquid permeation was judged by visually checking for wetting of the piece of paper 1 minute after dripping. Note that, when the color of the back side of the piece of paper was discolored, it was judged that complete permeation (o) has occurred, and when it was not discolored, it was judged that no permeation (x) occurred because the droplet had not penetrated to the back side. The maximum water concentration means the highest water concentration among the water concentrations of the permeating liquid droplets of aqueous ethanol solution (note that the ethanol concentration is converted into purity 100% when calculating the water concentration). Also, in Table 1 below, the surface free energy of the aqueous ethanol solution at the maximum water concentration is also shown.
(EW of Fluorine-Containing Ion Exchange Resin)

Approximately 0.02 to 0.10 g of an acid type fluorine-containing ion exchange resin was soaked in 50 mL of 25° C. saturated NaCl aqueous solution (0.26 g/mL), left to stand for 10 minutes while stirring, then a special grade phenolphthalein manufactured by Wako Pure Chemical Corporation, was used as an indicator and neutralization titration was carried out using a special grade 0.01 N aqueous sodium hydroxide solution manufactured by Wako Pure Chemical Corporation. After neutralization, the obtained Na type ion exchange membrane was rinsed with pure water, then vacuum dried and weighed. The equivalent mass EW (g/eq) was determined by the following formula, where the equivalent amount of sodium hydroxide required for neutralization was M (mmol) and the mass of Na type ion exchange membrane was W (mg).

$$EW = (W/M) - 22$$

(Melt Flow Rate (MFR) of Fluorine-Containing Ion Exchange Resin Precursor)

Based on JIS K-7210, the melt flow rate (MFR, g/10 min) of the fluorine-containing ion exchange resin precursor was measured at a temperature of 270° C. under a load of 2.16 kg using an apparatus having an orifice inner diameter of 2.09 mm and a length of 8 mm.
(Concentration of Fluorine-Containing Ion Exchange Resin in Dispersion Composition)

The mass of a dried, room temperature weighing bottle was precisely weighed and defined as W0. 10 g of an object to be measured was placed in the measured weighing bottle, precisely weighed and defined as W1. The weighing bottle containing the object to be measured was dried for 3 hours or more at a temperature of 110° C. and an absolute pressure of 0.01 MPa or less using an LV-120 type vacuum dryer manufactured by Espec Corporation, then cooled in a desiccator containing silica gel, and after reaching room temperature, was precisely weighed and defined as W2. (W2−W0)(W1−W0) was expressed as a percentage and measured five times, and the average value was taken as the fluorine-containing ion exchange resin concentration.
(Proton Conductivity of Electrolyte Membrane)

The proton conductivity of the electrolyte membrane was evaluated by 4 terminal in-plane AC impedance measurement. Platinum plates were used as the electrodes, an electrolyte membrane was sandwiched between 2 glass slides for each platinum plate, and both ends of the glass slides were secured with clips. The electrolyte membrane was placed in a temperature and humidity chamber SH-241 (manufactured by Espec), and, at a temperature of 80° C., the relative humidity was changed from 90% RH to 20% RH in increments of 10% RH, and after stabilizing at each humidity for at least 4 hours, the AC impedance was measured. For the AC impedance measurement, an impedance analyzer Solartron 1260 (Solartron, UK) was used, the AC Amplitude was a value between 10 and 100 mV and the frequency was scanned from 100,000 Hz to 1 Hz.
(Evaluation of Fuel Cell)

The coating liquid was prepared by putting 10.84 g of a dispersion composition of a fluorine-containing ion exchange resin having an EW of 560, which is the same as the raw material used for the electrolyte membrane described below, 2.0 g of TKK Pt/C (Tanaka Holdings Co., Ltd., TEC10E50E, platinum loading amount of 45.90/a) as a catalyst, 8.67 g of RO water, 8.67 g of 1-propanol and 8.67 g of 2-propanol into a zirconia container together with 200 g of zirconia balls (φ5), and mixing using a planetary ball mill (manufactured by Fritz of Germany) at a rotation speed of 200 rpm for 1 hour.

The electrode catalyst layer was prepared by coating the coating liquid prepared as described above on a polytetrafluoroethylene (PTFE) sheet with an applicator PI-1210 (Tester Sangyo) and drying in an air atmosphere. The amount of platinum loaded was adjusted to around 0.3 mg/cm².

The MEA was prepared by sandwiching an electrolyte membrane between two of the aforementioned electrode catalyst layers cut out to 5 cm², hot-pressing at 135° C. and a pressure of 2.0 kN for 1 minute, then peeling off the PTFE sheet (decal method).

Both sides of the MEA were sandwiched between gas diffusion layers (SIGRACET GDL 24 BC, manufactured by SGL GROUP), and assembled into a single cell (catalytic layer area: 5 cm²) made by ElectroChem together with a gasket. The cell temperature was set to 80° C., a water bubbling method was used to control the relative humidity of gas flowing to both electrodes, and two types of electrochemical characteristics were measured. One involved a current interrupt method, in which hydrogen gas was supplied to the anode side and oxygen gas was supplied to the cathode side at flow rates of 100 mL/min and 500 mL/min, respectively, and the relative humidity at both electrodes were simultaneously changed to 60% RH, 30% RH, 20% RH and 10% RH. Using an electrochemical measurement system HZ-3000 (Hokuto Denko Co., Ltd.) with an initial state of 1 A/cm², a current was passed through the cell for 1 minute and the ohmic resistance was calculated by measuring the voltage change when the current was momentarily interrupted. The second involved I-V characteristic test, in which hydrogen gas was supplied as fuel to the anode side and oxygen gas or air was supplied as an oxidizing agent to the cathode side at flow rates of 100 mL/min and 500 mL/min, respectively, and the relative humidity at both electrodes were simultaneously changed to 30% RH, 20% RH, 10% RH. The cell voltage was measured when the current was driven from 0 to 10 A with a battery charging and discharging device HJ 1010 SMSA (Hokuto Denko Corporation).

(Microporous Polyolefin Membrane Production)

Production Example 1

A polyethylene composition comprising a mixture of 12 parts by mass of a high molecular weight polyethylene (PE1) with a mass-average molecular weight of 4,600,000, and 3 parts by mass of a low molecular weight polyethylene (PE2) with a mass-average molecular weight of 560,000 was used, and a polyethylene solution was prepared so that the concentration of the total amount of the polyethylene resin was 15% by mass by mixing with a solvent mixture of 72 parts by mass of liquid paraffin and 13 parts by mass of decalin (decahydronaphthalene) which was prepared in advance.

Gel-like sheets (base tape) were produced by extruding this polyethylene solution into sheets using a die at a temperature of 160° C., cooling the extrudate in a water bath at 25° C. and providing a water stream on the surface layer of the water bath so that the mixed solvent released from the sheet, which gellified in the water bath, and floating on the water surface does not again adhere to the sheet. The base tape was dried for 10 minutes at 55° C. and a further 10 minutes at 95° C. to remove the decalin from within the base tape. Thereafter, the base tape was stretched by a ratio of 5.5 in the longitudinal direction at 100° C., and then stretched by a ratio of 13 in the transverse direction at 110° C. after which heat treatment (heat fixing) at 135° C. was immediately carried out.

Next the microporous polyethylene membrane was soaked successively in two separate tanks containing methylene chloride baths for 30 seconds, respectively, while liquid paraffin was extracted therefrom. Note that the purity of the washing solvent in the first tank (low)<in the second tank (high), wherein the first tank was on the side where soaking was started and the second tank was on the side where soaking was finished. Thereafter, the microporous polyethylene membrane was obtained by removing the methylene chloride by drying at 45° C., and by carrying out annealing treatment while transporting over rollers heated to 120° C.

The obtained microporous polyethylene membrane had excellent permeability to ethanol/water=½ solution and was suitable as a substrate for a composite membrane. Note that Table 1 below indicates the physical property values and evaluation results of the microporous polyethylene membrane.

Production Example 2

A microporous polyethylene membrane obtained in the same way as in production example 1 except for the following. A polyethylene composition comprising a mixture of 6 parts by mass of a high molecular weight polyethylene (PE1) with a mass-average molecular weight of 4,600,000, and 24 parts by mass of a low molecular weight polyethylene (PE2) with a mass-average molecular weight of 560,000 was used, and a polyethylene solution was prepared so that the concentration of the total amount of the polyethylene resin was 30% by mass by mixing with a solvent mixture of 6 parts by mass of decalin (decahydronaphthalene) and 64 parts by mass of paraffin which was prepared in advance.

A gel-like sheet was prepared by extruding this polyethylene solution into sheets using a die at 160° C. then cooling the extrudate in a water bath at 25° C.

The base tape was dried for 10 minutes at 55° C. and for a further 10 minutes at 95° C. to remove decalin from the base tape. Thereafter, the base tape was stretched by a ratio of 5.5 in the longitudinal direction at 100° C. and then stretched by a ratio of 13 in the transverse direction at 110° C. after which heat treatment (heat fixing) at 125° C. was immediately carried out.

As shown in Table 1 below, the obtained microporous polyethylene membrane has excellent permeability to ethanol/water=½ solution and is suitable as a substrate for a composite membrane.

Production Example 3

A microporous polyethylene membrane obtained in the same way as in Production Example 1 except for the following. A polyethylene composition comprising a mixture of 16 parts by mass of a high molecular weight polyethylene (PE1) with a mass-average molecular weight of 4,600,000, and 4 parts by mass of a low molecular weight polyethylene (PE2) with a mass-average molecular weight of 560,000 was used, and a polyethylene solution was prepared so that the concentration of the total amount of the polyethylene resin was 20% by mass by mixing with a solvent mixture of 2 parts by mass of decalin (decahydronaphthalene) and 78 parts by mass of paraffin which was prepared in advance.

A gel-like sheet was prepared by extruding this polyethylene solution into sheets using a die at 160° C. then cooling the extrudate in a water bath at 25° C.

The base tape was dried for 10 minutes at 55° C. and for a further 10 minutes at 95° C. to remove decalin from the base tape. Thereafter, the base tape was stretched by a ratio of 3.9 in the longitudinal direction at 100° C. and then stretched by a ratio of 13 in the transverse direction at 100° C. after which heat treatment (heat fixing) at 135° C. was immediately carried out.

As shown in Table 1 below, the obtained microporous polyolefin membrane has excellent permeability to ethanol/water=½ solution and is suitable as a substrate for a composite membrane.

Production Example 4

A microporous polyethylene membrane obtained in the same way as in Production Example 1 except for the following. A polyethylene composition comprising a mixture of 16 parts by mass of a high molecular weight polyethylene (PE1) with a mass-average molecular weight of 4,600,000, and 4 parts by mass of a low molecular weight polyethylene (PE2) with a mass-average molecular weight of 560,000 was used, and a polyethylene solution was prepared so that the concentration of the total amount of the polyethylene resin was 20% by mass by mixing with a solvent mixture of 2 parts by mass of decalin (decahydronaphthalene) and 78 parts by mass of paraffin which was prepared in advance.

A gel-like sheet was prepared by extruding this polyethylene solution into sheets using a die at 160° C. then cooling the extrudate in a water bath at 25° C.

The base tape was dried for 10 minutes at 55° C. and for a further 10 minutes at 95° C. to remove decalin from the base tape. Thereafter, the base tape was stretched by a ratio of 5 in the longitudinal direction at 100° C. and then stretched by a ratio of 9 in the transverse direction at 105° C. after which heat treatment (heat fixing) at 135° C. was immediately carried out.

As shown in Table 1 below, the obtained microporous polyolefin membrane has excellent permeability to ethanol/water=½ solution and is suitable as a substrate for a composite membrane.

Production Example 5

The polyethylene solution was prepared in the same way as for Production Example 1.

A gel-like sheet was prepared by extruding this polyethylene solution into sheets using a die at 160° C. then cooling the extrudate in a water bath at 25° C.

The base tape was dried for 10 minutes at 55° C. and for a further 10 minutes at 95° C. to remove decalin from the base tape. Thereafter, the base tape was stretched by a ratio of 7 in the longitudinal direction at 100° C. and then stretched by a ratio of 13 in the transverse direction at 100° C. after which heat treatment (heat fixing) at 135° C. was immediately carried out. Apart from these differences, the microporous polyethylene membrane was obtained in the same way as in Production Example 1.

As shown in Table 1 below, the obtained microporous polyethylene membrane has excellent permeability to ethanol/water=½ solution and is suitable as a substrate for a composite membrane.

Production Example 6

A microporous polyethylene membrane obtained in the same way as in Production Example 1 except for the following. A polyethylene composition comprising a mixture of 6 parts by mass of a high molecular weight polyethylene (PE1) with a mass-average molecular weight of 4,600,000, and 6 parts by mass of a low molecular weight polyethylene (PE2) with a mass-average molecular weight of 560,000 was used, and a polyethylene solution was prepared so that the concentration of the total amount of the polyethylene resin was 12% by mass by mixing with a solvent mixture of 30 parts by mass of decalin (decahydronaphthalene) and 58 parts by mass of paraffin which was prepared in advance.

A gel-like sheet was prepared by extruding this polyethylene solution into sheets using a die at 160° C. then cooling the extrudate in a water bath at 25° C.

The base tape was dried for 10 minutes at 55° C. and for a further 10 minutes at 95° C. to remove decalin from the base tape. Thereafter, the base tape was stretched by a ratio of 6.5 in the longitudinal direction at 110° C., and then stretched by a ratio of 15 in the transverse direction at 115° C. after which heat treatment (heat fixing) at 138° C. was immediately carried out.

As shown in Table 1 below, the obtained microporous polyethylene membrane has excellent permeability to ethanol/water=½ solution and is suitable as a substrate for a composite membrane.

TABLE 1

| | Thickness [um] | Porosity [%] | Average pore diameter [um] | Gurley value [sec./100 cc] | Tensile breaking strength MD [MPa] | Tensile breaking strength TD [MPa] | Contact angle (degrees) 1 second after | Contact angle (degrees) 10 min. after | Rate of change of contact angle % | Permeability of ethanol-water solution (95% EtOH vol %) 30% | 31% | 32% |
|---|---|---|---|---|---|---|---|---|---|---|---|---|
| Production example 1 | 6 | 66 | 31 | 30 | 150 | 180 | 84 | 49 | 41 | x | o | o |
| Production example 2 | 11 | 50 | 20 | 85 | 130 | 220 | 78 | 65 | 17 | x | x | x |
| Production example 3 | 5 | 55 | 25 | 70 | 130 | 180 | 73 | 59 | 20 | x | x | x |
| Production example 4 | 12 | 55 | 30 | 90 | 140 | 160 | 78 | 57 | 26 | x | x | x |

TABLE 1-continued

| | | | | | | | | | | | | |
|---|---|---|---|---|---|---|---|---|---|---|---|---|
| Production example 5 | 6 | 63 | 50 | 36 | 190 | 180 | 63 | 52 | 40 | x | x | o |
| Production example 6 | 8 | 78 | 35 | 30 | 55 | 110 | 80 | 45 | 44 | x | o | o |

| | Permeability of ethanol-water solution (95% EtOH vol %) | | | | | | | | Maximum water concentration | | | Surface free energy of liquid |
|---|---|---|---|---|---|---|---|---|---|---|---|---|
| | | | | | | | | | Maximum Et concentration | Actual EtOH | | |
| | 33% | 34% | 35% | 36% | 37% | 38% | 39% | 40% | vol % | wt % | vol % | (mJ/m²) |
| Production example 1 | o | o | o | o | o | o | o | o | 29.5% | 23.1% | 70.6% | 36.5 |
| Production example 2 | o | o | o | o | o | o | o | o | 31.4% | 24.6% | 68.7% | 35.8 |
| Production example 3 | o | o | o | o | o | o | o | o | 31.4% | 24.6% | 68.7% | 35.8 |
| Production example 4 | x | o | o | o | o | o | o | o | 32.3% | 25.4% | 67.7% | 35.4 |
| Production example 5 | o | o | o | o | o | o | o | o | 30.4% | 23.9% | 69.6% | 36.2 |
| Production example 6 | o | o | o | o | o | o | o | o | 29.5% | 23.1% | 70.6% | 36.4 |

(Production of Fluorine-Containing Ion Exchange Resin)

A fluorine-containing ion exchange resin precursor comprising a copolymer (MFR=3.0) of the fluorinated olefin ($CF_2=CF_2$) of formula (3) in which Z=F and the fluorinated vinyl compound ($CF_2=CF-O-(CF2)_2-SO_2F$) of formula (4) in which m=2, n=0 and W=$SO_2F$ was extruded at 270° C. from a round nozzle using an extruder and then cut into cylindrical pellets with a diameter of 2 to 3 mm and a length of 4 to 5 mm. 510 g of the fluorine-containing ion exchange resin precursor pellets were soaked for 6 hours in 3160 g of an aqueous KOH solution previously prepared by adding KOH and DMSO so as to have a KOH concentration of 15% by mass and a DMSO concentration of 30% by mass, converting the $SO_2F$ groups in the fluorine-containing ion exchange resin precursor to $SO_3K$ groups.

The treated pellets were soaked for 6 hours in 1 N-HCL (2500 mL) at 60° C., rinsed in 60° C. ion exchange water (conductivity of 0.06 S/cm or less) and dried to obtain a fluorine-containing ion exchange resin (EW=560 g/eq) comprising proton exchange groups wherein the $SO_3K$ groups were converted to $SO_3H$ groups.

Next, 120 g of the fluorine-containing ion exchange resin (moisture content: 28.7% by mass), 485 g of ethanol, and 949 g of ion exchanged water were poured into the glass inner tube of a 5 L capacity, SUS 304 autoclave, and 70 g of ethanol and 140 g of ion-exchanged water were provided between the inner cylinder and the inner wall of the autoclave. Dispersion treatment was carried out for 4 hours at 162° C. on liquid in the glass inner tube while stirring. The internal pressure of the autoclave increased with heating and the maximum pressure was 1.2 MPa. After cooling and removing from the autoclave, a uniform and transparent dispersion composition of a fluorine-containing ion exchange resin was obtained. The composition of this dispersion composition was 5.0% by mass of the fluorine-containing ion exchange resin, 30.0% by mass of ethanol and 65.0% by mass of water.

Subsequently, 350 g of the dispersion composition was poured into a 500 mL eggplant type flask, and azeotropic distillation was carried out at a reduced pressure of 0.04 MPa while rotating at 40 rpm at 80° C. using a rotary evaporator R-200 manufactured by BUCHI Co., concentrating the fluorine-containing ion exchange resin to a concentration of 15% by mass to obtain a dispersion composition. The composition of this dispersion composition was 9.8% by mass of the fluorine-containing ion exchange resin, 8.3% by mass of ethanol and 81.9% by mass of water.

(Preparation of Electrolyte Membrane for Solid Polymer Fuel Cell)

An electrolyte membrane for a solid polymer fuel cell was formed by impregnating the above microporous polyethylene membrane with a perfluorosulfonic acid polymer (EW 560) to support the perfluorosulfonic acid polymer in the pores of the microporous polyethylene membrane (1) Examination of Solvent Ratio Prior to impregnation, a microporous polyethylene membrane (white opaque membrane) was placed on a glass plate, a mixed solution of water/ethanol was gently dripped from above, and the change in color of the microporous membrane was confirmed. The following three types of mixed solution were used. A: water/ethanol=4/1 (mass ratio), B: water/ethanol=3/1 (mass ratio), and C: water/ethanol=2/1 (mass ratio). As a result, as only the mixed solution C (water/ethanol=2/1 (mass ratio)) changed the color of the microporous membrane to transparent, it could be confirmed that the pores of the microporous membrane were loaded with the mixed solution. Note that the color of the microporous membrane when mixed solutions A and B were used remained an opaque white and so the mixed solution did not permeate into the pores of the microporous membrane. In the following examples, an electrolyte membrane was prepared using the mixed solution C (water/ethanol=2/1 (mass ratio)).

Example 1

(Production of Solid Polymer Fuel Cell Electrolyte Membrane)

A polymer solution was prepared by dissolving the perfluorosulfonic acid polymer into a mixed solution of water/ethanol=2/1 (mass ratio) such that the polymer concentration was 3.3% by mass. The microporous polyethylene membrane obtained in Production Example 1 was soaked in ethanol, ultrasonically cleaned for 1 hour, and then dried overnight in an air atmosphere. About 0.3 ml of the polymer solution was thinly spread on a glass petri dish, the microporous polyethylene membrane (thickness 6 µm, porosity 66%, size about 10 mm×30 mm) was gently placed thereon, and then drying was performed overnight in an air atmosphere. Thereafter, about 0.3 ml of the polymer solution was thinly spread on the microporous polyethylene membrane, similarly dried overnight, and the solvent removed. Next, the microporous polyolefin membrane impregnated with the perfluorosulfonic acid polymer was annealed at 100° C. for 13.5 hours. Thereafter, the electrolyte membrane was taken out from the glass petri dish and stirred for 1 hour in a 1 M aqueous solution of nitric acid at 90° C. thereby performing proton substitution, followed by washing by stirring in RO water at 90° C. for 1 hour. An electrolyte membrane (membrane thickness: 11.8 µm) comprising a composite membrane was thereby obtained.

Comparative Example 1

An electrolyte membrane (membrane thickness 16.6 µm) comprising a composite membrane was manufactured in the same way as described above except for the use of a perfluorosulfonic acid polymer having an EW of 900.

Reference Example 1

As a reference example, an electrolyte membrane manufactured by Du Pont, Nafion NR 211 (membrane thickness of 25 µm), was used.
(Evaluation of Proton Conductivity)
The proton conductivity of an electrolyte membrane loaded with an EW 560 and EW 900 perfluorosulfonic acid polymer was evaluated by measuring AC impedance (in-plane). As a reference example, the measurement results of the proton conductivity of Nafion NR 211 (membrane thickness of 25 µm), which is an electrolyte membrane manufactured by Du Pont, are also shown. As shown in FIG. 1, the proton conductivity of the EW 560 electrolyte is significantly higher than the EW 900 electrolyte. This is due to the loading of a low EW perfluorosulfonic acid polymer exhibiting high proton conductivity. Further, a composite membrane loaded with an EW 900 electrolyte exhibits a lower conductivity than the NR211 membrane which has an EW value of approximately 1000. Thus, when an EW 900 electrolyte is loaded, it is considered that a composite membrane with excellent proton conductivity cannot be made.

Example 2

A thinner electrolyte membrane (about 7 µm in membrane thickness) was prepared by using the same microporous polyolefin membrane as in Example 1 and an EW 560 perfluorosulfonic acid polymer, by controlling the amount of the polymer solution dripped with respect to the area of the microporous membrane. Specifically, about 0.3 ml of a polymer solution was spread thinly on a glass petri dish, a microporous polyethylene membrane (thickness 6 µm, porosity 66%, size about 35 mm×35 mm) was gently placed thereon, and after drying overnight in the ambient environment, about 0.3 ml of the above polymer solution was thinly spread on the microporous polyethylene membrane. A catalyst layer was prepared by the aforementioned decal method using the perfluorosulfonic acid polymer (EW 560) as an ionomer, and the catalyst layer and the above electrolyte membrane were stacked then hot pressed (conditions: 135° C., 2.0 kN, 1 minute) to prepare a membrane electrode assembly (MEA) of a solid polymer fuel cell.

Figure 2:
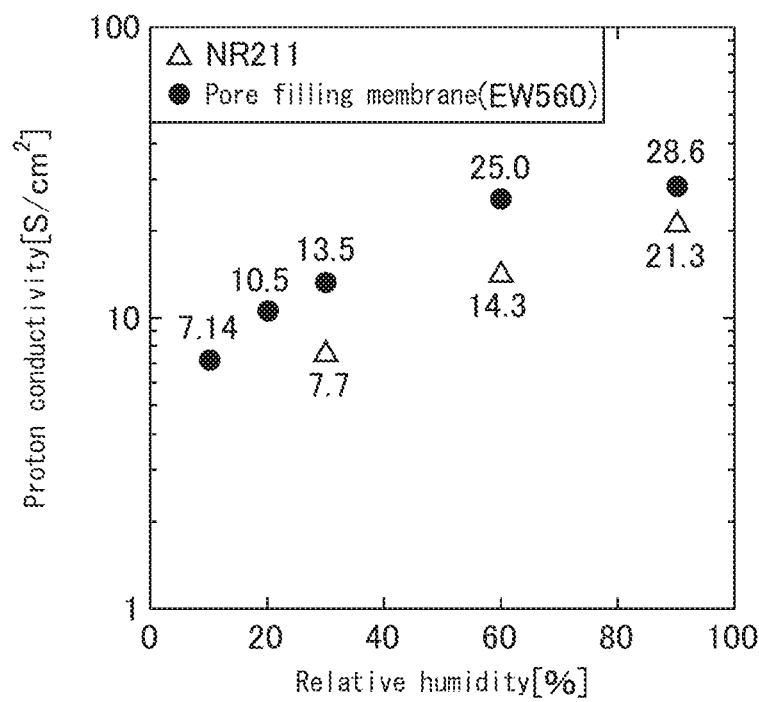
FIG. 2 is a graph comparing the dependence of proton conductivity to relative humidity of a membrane electrode assembly (MEA) using the microporous polyolefin membrane according to the present invention and a conventional electrolyte membrane.

FIG. 2 shows the results of calculating the proton conductivity of the MEA by calculating the ohmic resistance from the current interrupt for the MEA obtained as described above. As a reference example, an electrolyte membrane manufactured by Du Pont, Nafion NR 211 (membrane thickness of 25 µm), was used. As shown in FIG. 2, the MEA prepared using the microporous polyolefin membrane of the present invention has a higher performance than when NR211 is used in relation to proton conductivity as a result of being loaded with a high proton conductive, low EW perfluorosulfonic acid polymer and thinning of the membrane thickness to about one quarter.

Figure 3:
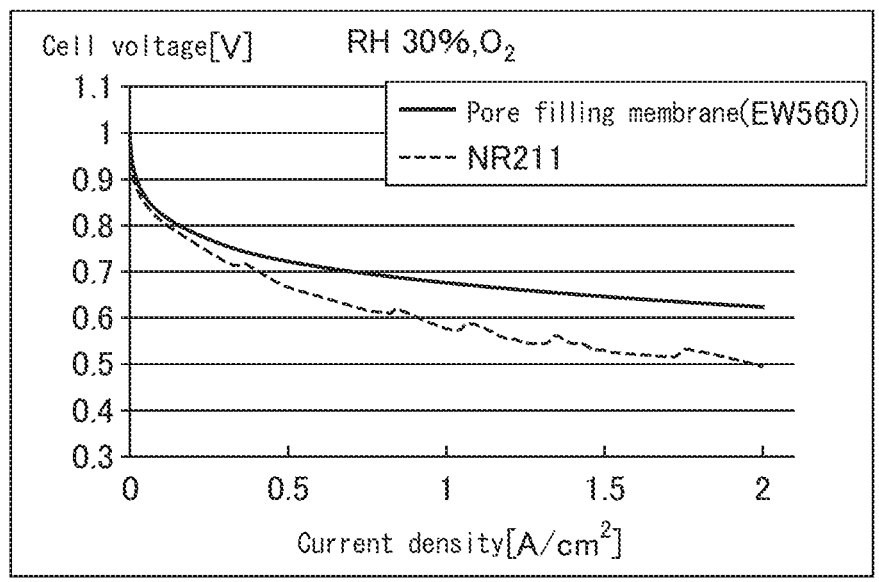
FIG. 3 is a graph comparing the current density dependence of the cell voltage at a humidity of 30% of an MEA using the microporous polyolefin membrane according to the present invention and a conventional electrolyte membrane.
Figure 3:
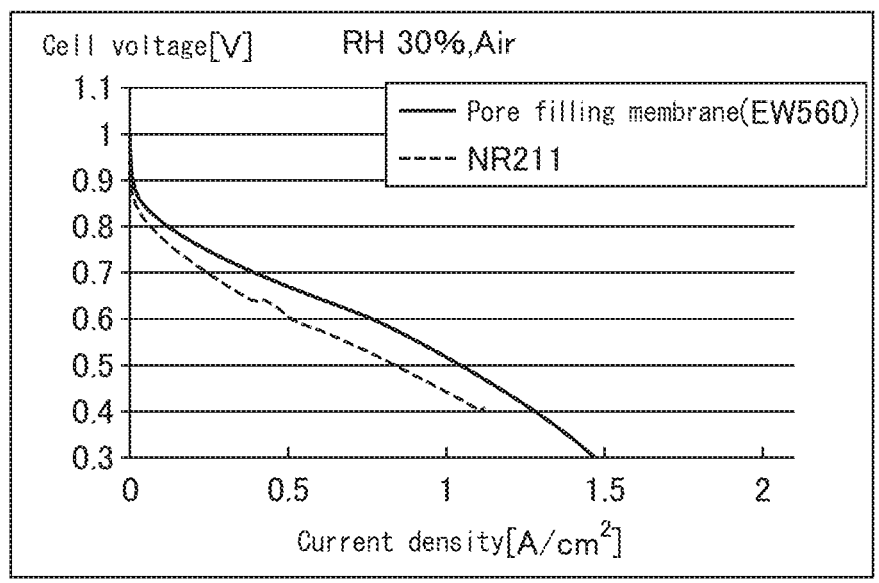
Figure 4:
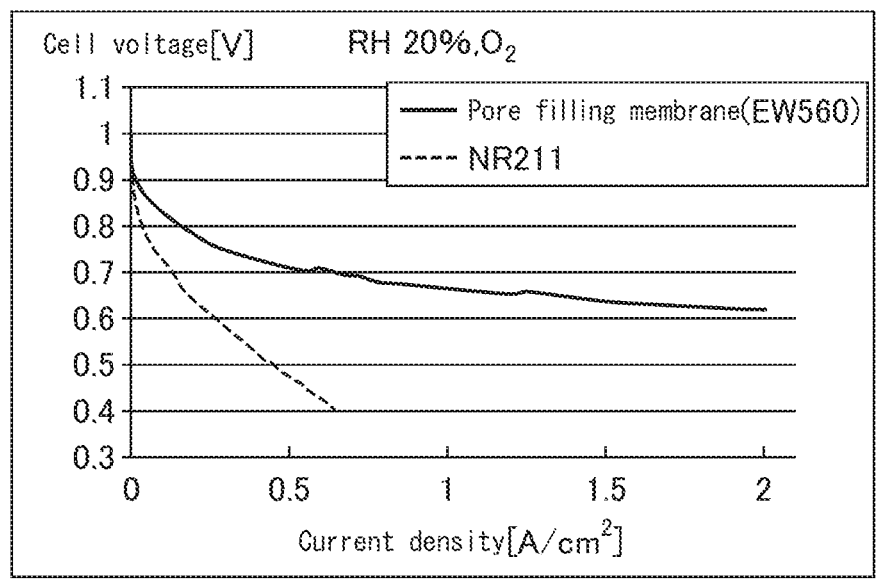
FIG. 4 is a graph comparing the current density dependence of the cell voltage at a humidity of 20% of an MEA using the microporous polyolefin membrane according to the present invention and a conventional electrolyte membrane.
Figure 4:
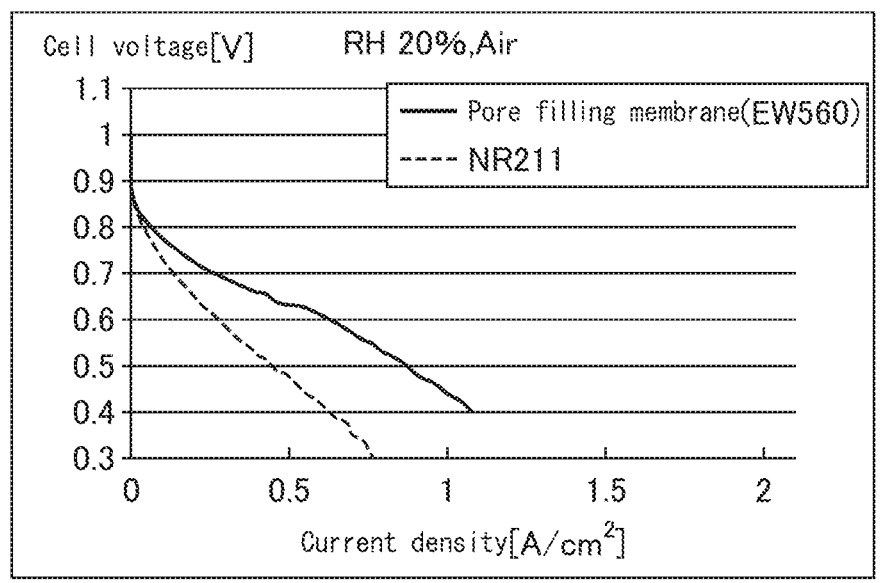
Figure 5:
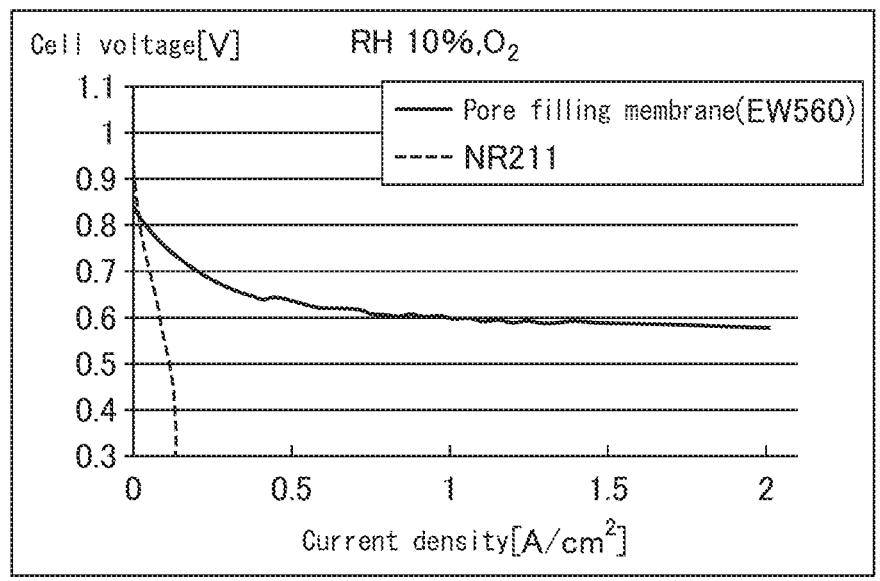
FIG. 5 is a graph comparing the current density dependence of the cell voltage at a humidity of 10% for an MEA using the microporous polyolefin membrane according to the present invention and a conventional electrolyte membrane.
Figure 5:
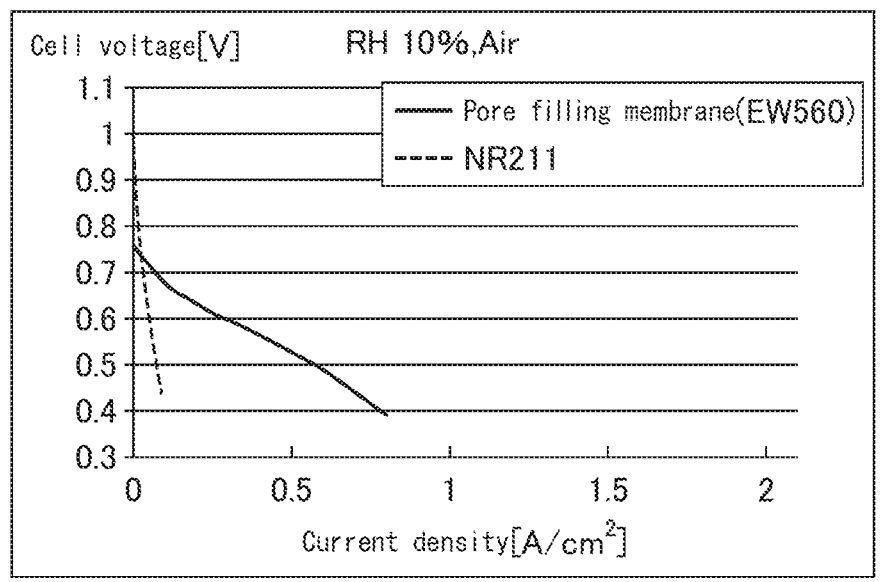

FIGS. 3 to 5 show the current density dependence of the cell voltage for the MEA obtained as described above at a humidity of 30%, 20% and 10% (oxidizing agent: oxygen or air). As a reference example, an electrolyte membrane manufactured by Du Pont, Nafion NR 211 (membrane thickness of 25 µm), was used. In particular, as shown in FIGS. 4 and 5, in a low humidity environment of 20% humidity, almost no electricity generation was possible with the conventional NR 211, whereas the MEA produced using the microporous polyolefin membrane of the present invention could generate electricity of up to 2 A/cm$^2$ (when oxygen was used as the oxidizing agent). Thus, it is understood that a novel electrolyte membrane was obtained. Based on the facts that a low EW perfluorosulfonic acid polymer (EW 560) having a high proton conductivity was used for the ionomer in the catalyst layer, that an electrolyte membrane was prepared by loading the microporous polyolefin membrane with the electrolyte of EW 560, and that the electrolyte membrane was thinned, it is considered that water generated at the cathode could sufficiently permeate to the anode side of the electrolyte membrane so that the humidity inside the electrolyte membrane could be maintained.

Figure 6:
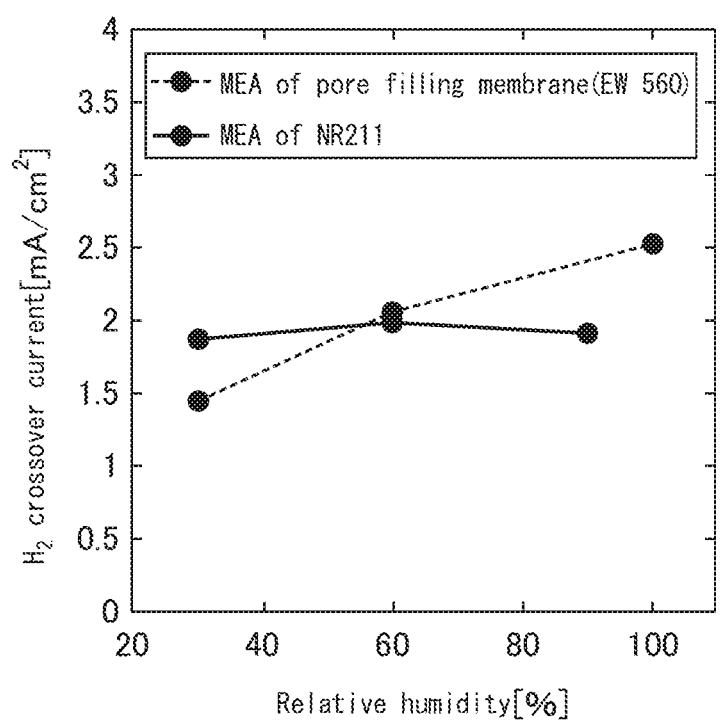
FIG. 6 is a graph comparing the results of a hydrogen crossover test for an MEA using the microporous polyolefin membrane according to the present invention and a conventional electrolyte membrane.

FIG. 6 shows the measurement results of a hydrogen crossover test for the MEA (EXAMPLE 2, REFERENCE EXAMPLE 1) obtained as described above. The hydrogen crossover test was carried out, after obtaining the MEA as described above, by measuring the oxidation current of hydrogen permeating through the membrane under conditions in which the temperature was 80° C. and the humidity was 20 to 100%. The amount of hydrogen supplied to the anode side was 100 ml/min and the amount of nitrogen supplied to the cathode side was 500 ml/min. As can be seen from FIG. 6, in the case of using the pore filling membrane of Example 2, although the membrane thickness was reduced to about a quarter of that of the conventional NR 211, it was confirmed that swelling of the electrolyte membrane by the microporous polyolefin membrane substrate was suppressed, thereby significantly limiting crossover of hydrogen.

Figure 7:
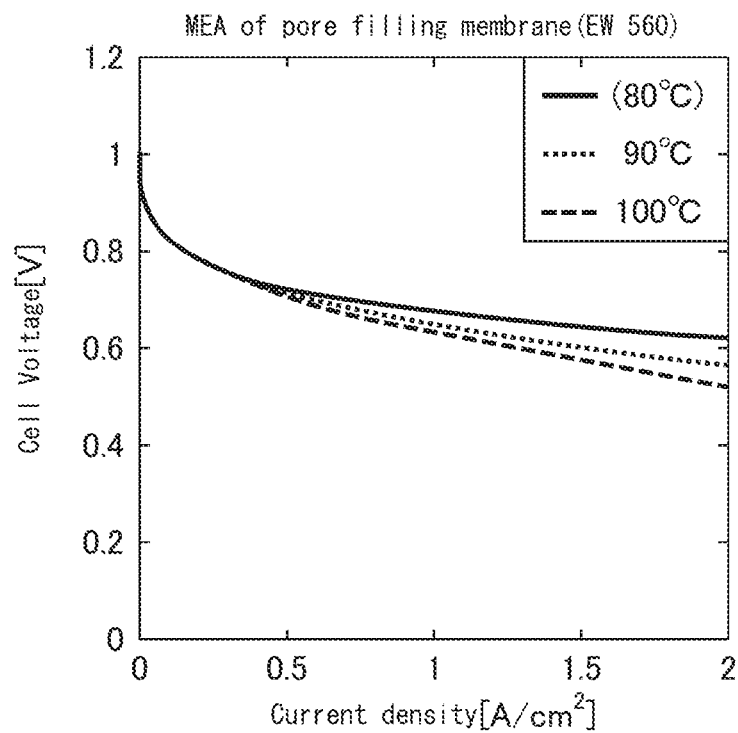
FIG. 7 is a graph comparing the current density dependence of cell voltage at a temperature of 80 to 100° C. for an MEA using the microporous polyolefin membrane according to the present invention and a conventional electrolyte membrane.
Figure 7:
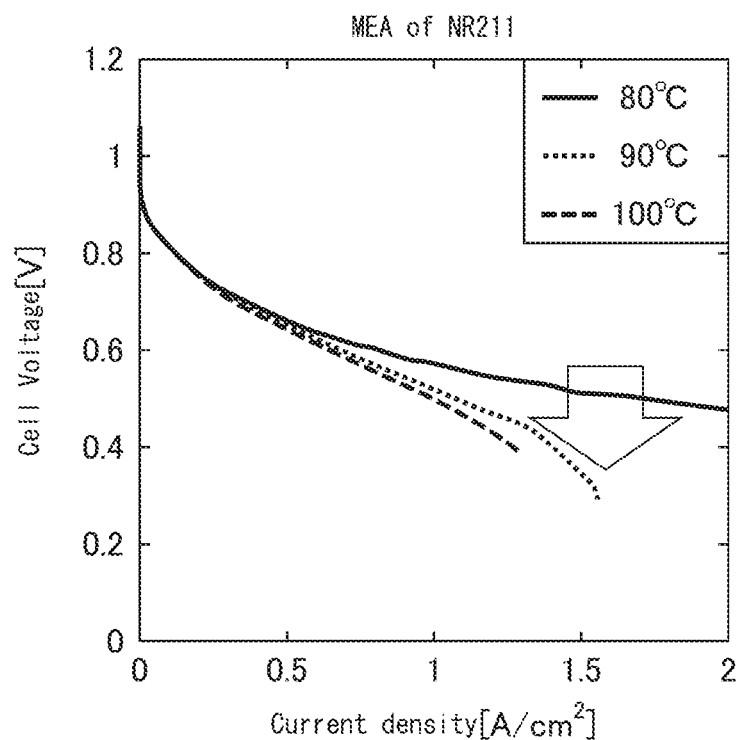

FIG. 7 shows the current density dependence of the cell voltage for the MEA (EXAMPLE 2, REFERENCE EXAMPLE 1) obtained as described above at cell temperatures of 80° C., 90° C. and 100° C. The current density was measured at a humidity of 30%. The amount of hydrogen supplied to the anode side was 100 ml/min and the amount of oxygen supplied to the cathode side was 500 ml/min. As can be seen from FIG. 7, in the conventional NR 211, when the cell temperature became 90° C. or higher, the cell voltage abruptly dropped. This is thought to be because water was discharged as steam and self-humidification of the membrane was difficult. However, when the pore filling membrane of Example 2 was used, the cell voltage did not decrease so much even in the high temperature region of 90° C. and 100° C., and it was possible for the membrane to self-humidify even at high temperatures. Thus, it can be understood that high power generation performance was exhibited in the high temperature and low humidity region.

Example 3

An electrolyte membrane (membrane thickness 11.4 µm) comprising a composite membrane was manufactured in the same way as in Example 1 except for the use of perfluorosulfonic acid polymer having an EW of 600.
(Evaluation of Proton Conductivity)

Figure 8:
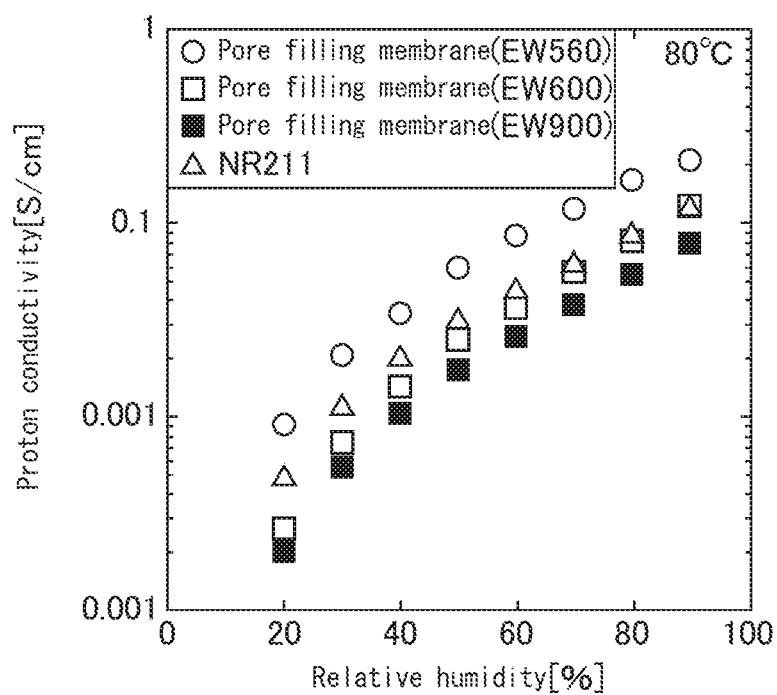
FIG. 8 is a graph comparing the proton conductivity, as measured by AC impedance (in-plane), of the electrolyte using the microporous polyolefin membrane according to the present invention and a conventional electrolyte membrane.

For the electrolyte membranes of Examples 2 and 3, Comparative Example 1 and Reference Example 1, the proton conductivity was evaluated by measuring AC impedance (in-plane) in the same manner as above, and the results are shown in FIG. 8. As shown in FIG. 8, the electrolytes of EW 560 and EW 600 had significantly higher proton conductivity than the electrolyte of EW 900.

INDUSTRIAL APPLICABILITY

The electrolyte membrane according to the present invention has industrial applicability as an electrolyte membrane that is thin and exhibits high proton conductivity and that can be advantageously used for solid polymer fuel cells, water electrolysis, and soda electrolysis.

The invention claimed is:

1. An electrolyte membrane comprising a composite membrane comprising:
a microporous polyolefin membrane consisting of polyethylene, that has an average pore diameter of 1 to 1000 nm and a porosity of 50 to 90% and that can be impregnated with a solvent having a surface free energy at 20° C. of 33 mJ/m$^2$ or more, without carrying out a forced loading process under an increased or decreased pressure and without implementing hydrophilization treatment; and
an electrolyte containing a perfluorosulfonic acid polymer having an EW of 250 to 650 loaded into the pores of the microporous polyolefin membrane; wherein
the membrane thickness of the composite membrane is 1 to 20 µm.

2. The electrolyte membrane according to claim 1, wherein the average pore diameter is 5 to 100 nm.

3. The electrolyte membrane according to claim 1, wherein the porosity is 50 to 78%.

4. The electrolyte membrane according to claim 1, wherein the microporous polyolefin membrane can be impregnated with a solvent having a surface free energy at 20° C. of 33 to 37 mJ/m$^2$.

5. The electrolyte membrane according to claim 1 wherein the electrolyte contains a perfluorosulfonic acid polymer having an EW of 450 to 650.

6. The electrolyte membrane according to claim 1 wherein the membrane thickness of the composite membrane is 5 to 12 µm.

7. The electrolyte membrane according to claim 1 wherein the electrolyte membrane is used as an electrolyte membrane for a solid polymer fuel cell, electrolysis of water or soda electrolysis.

8. A method of manufacturing the electrolyte membrane of claim 1 comprising the following steps:
impregnating a microporous polyolefin membrane consisting of polyethylene, that has an average pore diameter of 1 to 1000 nm and a porosity of 50 to 90% and that can be impregnated with a solvent having a surface free energy at 20° C. of 33 mJ/m$^2$ or more, without carrying out a forced loading process under an increased or decreased pressure and without implementing hydrophilization treatment, with a solution comprising an electrolyte including a perfluorosulfonic acid polymer having an EW of 250 to 650 dissolved in a solvent;
removing the solvent by drying the microporous polyolefin membrane after the impregnation step; and
annealing the microporous polyolefin membrane after the removing step.

9. The electrolyte membrane according to claim 2, wherein the porosity is 50 to 78%.

10. The electrolyte membrane according to claim 1, wherein the microporous polyolefin membrane has a Gurley value of from 30 to 90 seconds/100 cc.

11. The method according to claim 8, wherein the microporous polyolefin membrane has a Gurley value of from 30 to 90 seconds/100 cc.

\* \* \* \* \*